(12) United States Patent
Kobayashi

(10) Patent No.: US 11,846,367 B2
(45) Date of Patent: Dec. 19, 2023

(54) MIXER FAUCET

(71) Applicant: Takagi Co., Ltd., Kitakyushu (JP)

(72) Inventor: Satoshi Kobayashi, Kitakyushu (JP)

(73) Assignee: TAKAGI CO., LTD., Kitakyushu (JP)

( * ) Notice: Subject to any disclaimer, the term of this patent is extended or adjusted under 35 U.S.C. 154(b) by 113 days.

(21) Appl. No.: 17/594,088

(22) PCT Filed: Apr. 5, 2019

(86) PCT No.: PCT/JP2019/015137
§ 371 (c)(1),
(2) Date: Oct. 1, 2021

(87) PCT Pub. No.: WO2020/202551
PCT Pub. Date: Oct. 8, 2020

(65) Prior Publication Data
US 2022/0163134 A1    May 26, 2022

(51) Int. Cl.
*F16K 31/60* (2006.01)
*F16K 11/078* (2006.01)
(Continued)

(52) U.S. Cl.
CPC ........ *F16K 31/605* (2013.01); *F16K 11/0787* (2013.01); *F16K 19/006* (2013.01);
(Continued)

(58) Field of Classification Search
CPC .. F16K 31/605; F16K 11/0787; F16K 19/006; F16K 27/045; F16K 35/04; E03C 1/044
See application file for complete search history.

(56) References Cited

U.S. PATENT DOCUMENTS 3,526,250 A * 9/1970 Miller ................. F16K 11/0782
137/636.3
3,667,503 A * 6/1972 Farrell ................ F16K 11/0655
137/625.4
(Continued)

FOREIGN PATENT DOCUMENTS

JP    H08014422 A    1/1996
JP    2001304437 A    10/2001
(Continued)

*Primary Examiner* — Craig M Schneider
*Assistant Examiner* — Christopher D Ballman
(74) *Attorney, Agent, or Firm* — Alleman Hall Creasman & Tuttle LLP

(57) ABSTRACT

A mixer faucet having a left-right clicking mechanism and configured to increase a degree of freedom of the faucet is provided. The mixer faucet includes a lever handle and a valve assembly. The valve assembly includes: a tilting lever that is configured to move in conjunction with a movement of the lever handle, turn forward and rearward, and also turn leftward and rightward; a lower case; an upper case; a lower sealing member; an inner sealing member; and a click rotary member. The click rotary member is exposed to the outside of the valve assembly. The click rotary member is rotated leftward and rightward by a rotation force applied from the tilting lever. The click rotary member includes a first click engaging portion. The upper case includes a second click engaging portion. An engagement between the first click engaging portion and the second click engaging portion generates a left-right click.

20 Claims, 9 Drawing Sheets

(51) Int. Cl.
*F16K 11/00* (2006.01)
*F16K 27/04* (2006.01)
*E03C 1/044* (2006.01)
*F16K 35/04* (2006.01)

(52) U.S. Cl.
CPC ............ *F16K 27/045* (2013.01); *E03C 1/044* (2013.01); *F16K 35/04* (2013.01)

(56) References Cited

U.S. PATENT DOCUMENTS

| | | | | |
|---|---|---|---|---|
| 3,854,493 A * | 12/1974 | Farrell | ............... | F16K 11/0787 137/454.6 |
| 4,051,869 A * | 10/1977 | Holt | ............... | F16K 11/0787 137/636.1 |
| 4,088,153 A * | 5/1978 | Paasikivi | ............ | F16K 11/0787 137/625.4 |
| 4,325,403 A * | 4/1982 | Uhlmann | ............. | F16K 11/0787 137/315.18 |
| 4,375,824 A * | 3/1983 | von Borries | .......... | F16K 47/026 251/120 |
| 4,502,507 A * | 3/1985 | Hayman | ................ | F16K 41/02 251/214 |
| 4,610,268 A * | 9/1986 | Knapp | ................ | F16K 11/0787 137/454.6 |
| 4,733,688 A * | 3/1988 | Lorch | ................ | F16K 27/045 137/454.6 |
| 4,733,694 A * | 3/1988 | Knapp | ................ | F16K 11/0782 251/174 |
| 4,856,758 A * | 8/1989 | Knapp | ................ | F16K 25/005 251/368 |
| 4,942,902 A * | 7/1990 | Knapp | ................ | F16K 11/0782 251/363 |
| 5,069,249 A * | 12/1991 | Ostertag | .............. | F16K 47/023 251/50 |
| 5,095,934 A * | 3/1992 | Iqbal | .................... | F16K 27/045 137/636.2 |
| 5,144,981 A * | 9/1992 | Bergmann | ............. | F16K 31/605 251/235 |
| 5,195,555 A * | 3/1993 | Knapp | ................ | F16K 11/0782 137/454.2 |
| 5,386,852 A * | 2/1995 | Bosio | ..................... | F16K 35/06 251/285 |
| 5,402,827 A * | 4/1995 | Gonzalez | ............ | F16K 11/0787 137/271 |
| 5,839,464 A * | 11/1998 | O'Hara | ................ | F16K 27/045 137/217 |
| 5,899,230 A * | 5/1999 | Orlandi | ................ | F16K 31/605 251/288 |
| 6,202,693 B1 * | 3/2001 | Bollo | .................... | F16K 27/045 137/636.2 |
| 6,676,025 B2 * | 1/2004 | Ginter | ................ | G05D 23/1353 236/12.2 |
| 6,920,899 B2 * | 7/2005 | Haenlein | ............. | F16K 11/0746 137/636.3 |
| 6,981,693 B1 * | 1/2006 | Chang | ................... | F16K 31/605 251/368 |
| 7,032,272 B2 * | 4/2006 | Haenlein | ................... | E05D 3/10 16/366 |
| 7,108,012 B2 * | 9/2006 | Rosko | ................ | F16K 11/0787 251/297 |
| 7,410,147 B2 * | 8/2008 | Chen | ....................... | E03C 1/041 251/285 |
| 7,575,025 B2 * | 8/2009 | Fleischmann | ......... | E03C 1/0412 4/677 |
| 7,861,742 B2 * | 1/2011 | Kim | ...................... | F16K 31/605 137/636 |
| 8,434,513 B2 * | 5/2013 | Kacik | ................ | F16K 11/0787 137/625.4 |
| 8,459,303 B2 * | 6/2013 | Loschelder | ........... | F16K 27/045 137/625.41 |
| 8,875,737 B2 * | 11/2014 | Cattaneo | ............ | F16K 11/0787 137/625.4 |
| 9,103,102 B1 * | 8/2015 | Prabhakar | ............... | F16K 31/60 |
| 9,228,675 B2 * | 1/2016 | Chen | .................... | F16K 27/044 |
| 10,167,963 B1 * | 1/2019 | Chang | .................. | F16K 11/072 |
| 10,167,964 B1 * | 1/2019 | Chang | .................. | F16K 31/002 |
| 10,724,216 B2 * | 7/2020 | Cattaneo | ............ | F16K 27/044 |
| 2010/0212760 A1 * | 8/2010 | Kim | .................... | F16K 11/0787 137/605 |
| 2011/0000564 A1 * | 1/2011 | Corbin | ............... | F16K 11/0787 137/625.4 |

FOREIGN PATENT DOCUMENTS

| | | |
|---|---|---|
| JP | 2008088678 A | 4/2008 |
| JP | 2008127739 A | 6/2008 |
| JP | 2012002346 A | 1/2012 |
| JP | 2014145392 A | 8/2014 |
| JP | 2014214581 A | 11/2014 |
| JP | 3216595 U | 6/2018 |
| JP | 2018184769 A | 11/2018 |
| WO | 2013072909 A1 | 5/2013 |

* cited by examiner

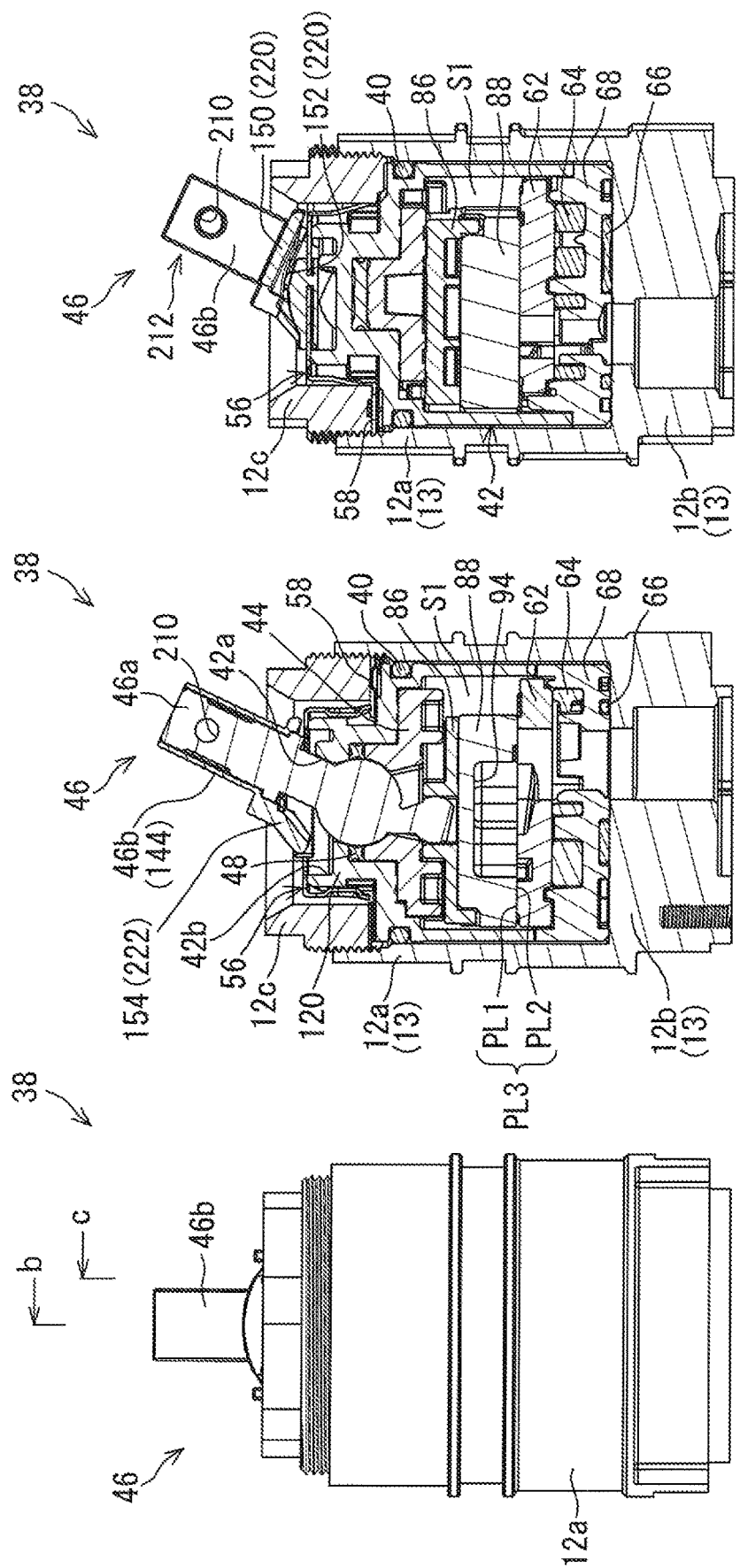

MIXER FAUCET

TECHNICAL FIELD

The present disclosure relates to a mixer faucet.

BACKGROUND ART

There has been known a single lever mixer faucet including a fixed valve body and a movable valve body that slides on the fixed valve body. JP 2008-127739A discloses a single lever mixer faucet including an interlocking notch and an interlocking piece that catches an operating lever with a resistance force of a predetermined value or greater when the operating lever is situated at up-down turning positions other than an up-down turning position at which the amount of discharge water is zero. In this mixer faucet, engagement and/or disengagement between the interlocking piece and the interlocking notch can generate a click. That is, in this mixer faucet, a click can be generated when the operating lever is turned leftward and rightward (hereinafter, a click generated by turning a lever leftward and rightward is also referred to as a left-right click). In this mixer faucet, the left-right click is not generated when the mixer faucet is in a water shut-off state. The left-right click is generated only when the mixer faucet is in a water discharge state.

CITATION LIST

Patent Literature

Patent Literature 1: JP 2008-127739A

SUMMARY OF THE INVENTION

Problems to be Solved by the Invention

When a mechanism in which a left-right click is generated, which is referred to as a left-right clicking mechanism, is provided in a faucet, such a mechanism can impose restrictions on the structure of the faucet. A faucet having fewer restrictions on its structure is preferable.

The present disclosure relates to a mixer faucet including a left-right clicking mechanism and configured such that the degree of freedom in the structure of the faucet can be increased.

Solution to Problems

According to one aspect, the present disclosure provides a mixer faucet including a faucet main body, a lever handle that is configured to turn forward and rearward and also turn leftward and rightward, and a valve assembly that is housed inside the faucet main body. The valve assembly includes: a fixed valve body that has a hot water supply hole, a cold water supply hole, and a drain hole; a movable valve body that has a flow path forming recess and that is configured to move on the fixed valve body; a tilting lever that is configured to: move in conjunction with a movement of the lever handle, turn forward and rearward to change a lever tilting position, and turn leftward and rightward to change a left-right lever position; a lower case that is disposed on a lower side of the fixed valve body and has a hot water inlet hole, a cold water inlet hole, and a discharge hole; an upper case that is fixed to the lower case, the upper case and the lower case constituting an outer surface of the valve assembly; a lower sealing member that seals a gap between the lower case and the faucet main body; an inner sealing member that is disposed between the fixed valve body and the lower case, and that seals a gap between the hot water supply hole and the hot water inlet hole, a gap between the cold water supply hole and the cold water inlet hole, and a gap between the drain hole and the discharge hole; and a click rotary member that is exposed to the outside of the valve assembly and is configured to be rotated leftward and rightward by a rotation force applied from the tilting lever. The click rotary member includes a first click engaging portion. The upper case includes a second click engaging portion. An engagement between the first click engaging portion and the second click engaging portion generates a left-right click.

According to another aspect, the present disclosure provides a mixer faucet including a faucet main body, a lever handle that is configured to turn forward and rearward and also turn leftward and rightward, and a valve assembly that is housed inside the faucet main body. The valve assembly includes: a fixed valve body that has a hot water supply hole, a cold water supply hole, and a drain hole; a movable valve body that has a flow path forming recess and that is configured to move on the fixed valve body; a tilting lever that is configured to: move in conjunction with a movement of the lever handle, turn forward and rearward to change a lever tilting position, and turn leftward and rightward to change a left-right lever position; a lower case that is disposed on a lower side of the fixed valve body and has a hot water inlet hole, a cold water inlet hole, and a discharge hole; an upper case that is fixed to the lower case, the upper case and the lower case constituting an outer surface of the valve assembly; a lower sealing member that seals a gap between the lower case and the faucet main body; and an inner sealing member that is disposed between the fixed valve body and the lower case, and that seals a gap between the hot water supply hole and the hot water inlet hole, a gap between the cold water supply hole and the cold water inlet hole, and a gap between the drain hole and the discharge hole. The tilting lever includes an exposed lever portion that is exposed to the outside and upper side of the valve assembly. The exposed lever portion includes a through hole that has an empty inside and contains nothing therein.

Advantageous Effects of Invention

According to one aspect, the present disclosure improves the degree of freedom in design of a faucet including a left-right clicking mechanism. According to another aspect, the present disclosure facilitates the taking out of a valve assembly from a faucet.

BRIEF DESCRIPTION OF DRAWINGS

In FIG. 2(a), a tilting lever is situated at a water shut-off position. In FIG. 2(b), the tilting lever is situated at a maximum water discharge position.

FIG. 4(a) a side view of a valve surrounding area in which the valve assembly in FIG. 2(b) is included, FIG. 4(b) is a cross-sectional view taken along line b-b in FIG. 4(a), and FIG. 4(c) is a cross-sectional view taken along line c-c in FIG. 4(a).

FIG. 6(a) shows the perspective view of the lever cap as viewed from obliquely above. FIG. 6(b) shows the perspective view of the lever cap as viewed from obliquely below.

FIG. 8(a) shows the perspective view of the metal member as viewed from obliquely above. FIG. 8(b) shows the perspective view of the metal member as viewed from obliquely below.

DESCRIPTION OF EMBODIMENTS

Embodiments of the present disclosure will be described in detail below with reference to the drawings as necessary. In the following, the terms "cold water" and "hot water" are used. For the purpose of distinguishing liquid from a hot water supply hole and liquid from a cold water supply hole, the terms "hot water" and "cold water" are used selectively, when necessary. On the other hand, in some descriptions, the term "water" is used to collectively refer to liquid from a hot water supply hole and from a cold water supply hole.

In the present disclosure, the terms "up", "down", "upper side", "lower side" and the like are used in view of normal use conditions of each embodiment. The posture of a faucet can be changed depending on its use conditions, specifications of the faucet, and specifications of facilities to which the faucet is installed. The terms should be appropriately construed in accordance with the posture of the installed faucet.

Unless otherwise described, the term "radial direction" used in the present disclosure means the radial direction of an upper case. Unless otherwise described, the term "circumferential direction" used in the present disclosure means the circumferential direction of the upper case.

Figure 1:
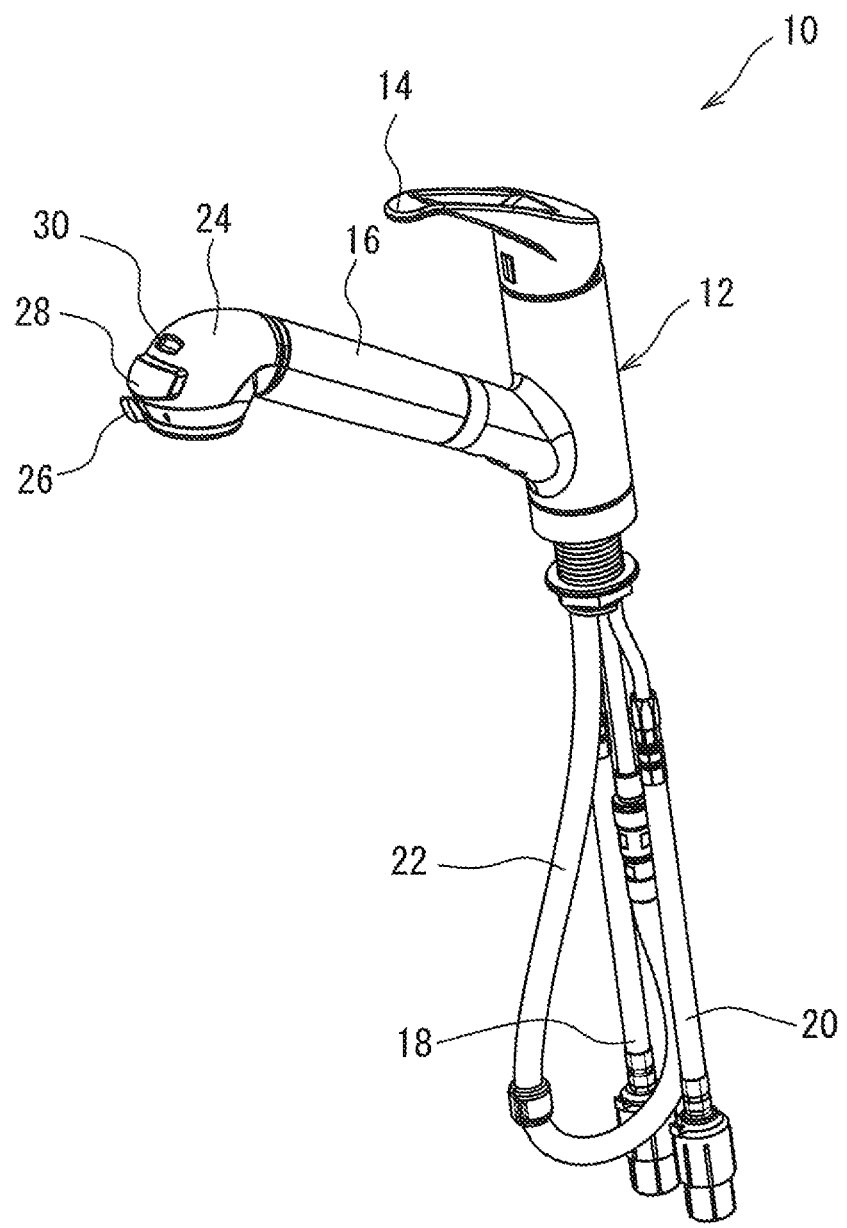
FIG. 1 is a perspective view of a mixer faucet according to one embodiment.

FIG. 1 is a perspective view of a mixer faucet 10 according to one embodiment. The mixer faucet 10 includes a faucet main body 12, a lever handle 14, a discharge portion 16, a hot water inlet pipe 18, a cold water inlet pipe 20, and a discharge pipe 22. The discharge portion 16 includes a head 24. The head 24 includes a switching lever 26. Switching between shower discharge and normal discharge can be achieved by operating the switching lever 26. The mixer faucet 10 is applicable to use in, for example, a kitchen or a washstand.

The head 24 also includes a switching button 28 and a display portion 30. A water purification cartridge (not shown) is accommodated in the discharge portion 16. The switching button 28 is used to perform switching between a purified water flow path through which water purified by the water purification cartridge flows and a raw water flow path through which water that is not purified by the water purification cartridge flows. When the purified water flow path is selected as a result of the switching, purified water is discharged. When the raw water flow path is selected as a result of the switching, raw water is discharged. The display portion 30 indicates whether discharge water is purified water or raw water.

By turning the lever handle 14 forward and rearward (by turning the lever handle 14 up and down), the amount of discharge water is adjusted. In the present embodiment, the amount of discharge water increases as the lever handle 14 is moved upward, and water is shut off when the lever handle 14 is moved to the lowest position. A water shut-off state is achieved as long as the lever handle 14 is at the lowest position even when the lever handle 14 is situated at any position in a left-right direction. Alternatively, the mixer faucet 10 may be configured such that the amount of discharge water increases as the lever handle 14 is moved downward. By turning the lever handle 14 leftward and rightward, the mixing ratio of hot water and cold water changes. The temperature of discharge water can be adjusted by changing the position of the lever handle 14 in the left-right direction, which is referred to as a left-right lever position in the present disclosure. Strictly speaking, the adjustment of the amount of discharge water is achieved actually by turning the lever handle 14 up and down, rather than forward and rearward. However, a tilting lever 46 that is moved in conjunction with the up-down turning of the lever handle 14 is turned forward and rearward. Thus, for the sake of easy understanding by using common terms, the up-down turning of the lever handle 14 is also referred to as forward and rearward turning in the present disclosure.

Figure 2A:
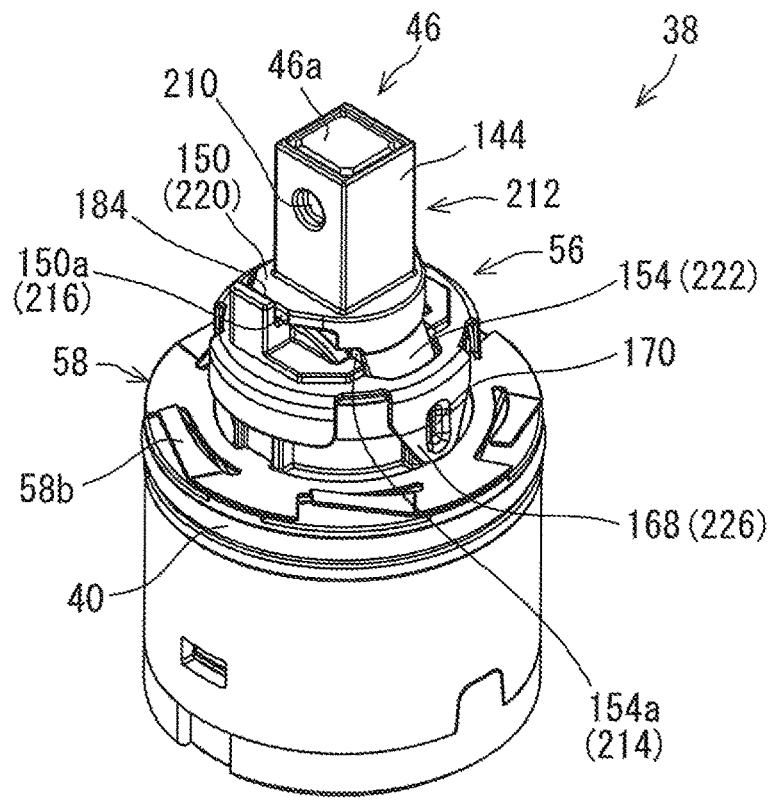
FIG. 2(a) and FIG. 2(b) are perspective views of a valve assembly used in the mixer faucet of FIG. 1.
Figure 2B:
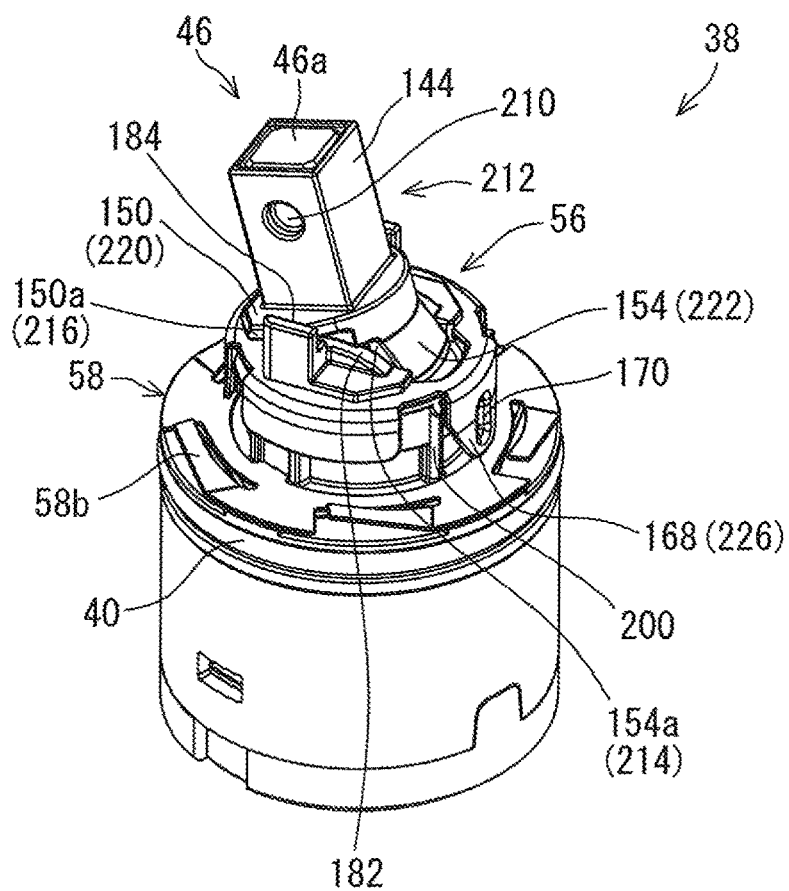

FIG. 2(a) and FIG. 2(b) are perspective views of a valve assembly 38. FIG. 2(a) is the perspective view of the valve assembly 38 in a water shut-off state. FIG. 2(b) is the perspective view of the valve assembly 38 in a water discharge state. FIG. 2(b) shows a state where the amount of discharge water is at the maximum (maximum water discharge state).

Figures 3A, 3B, 3C:
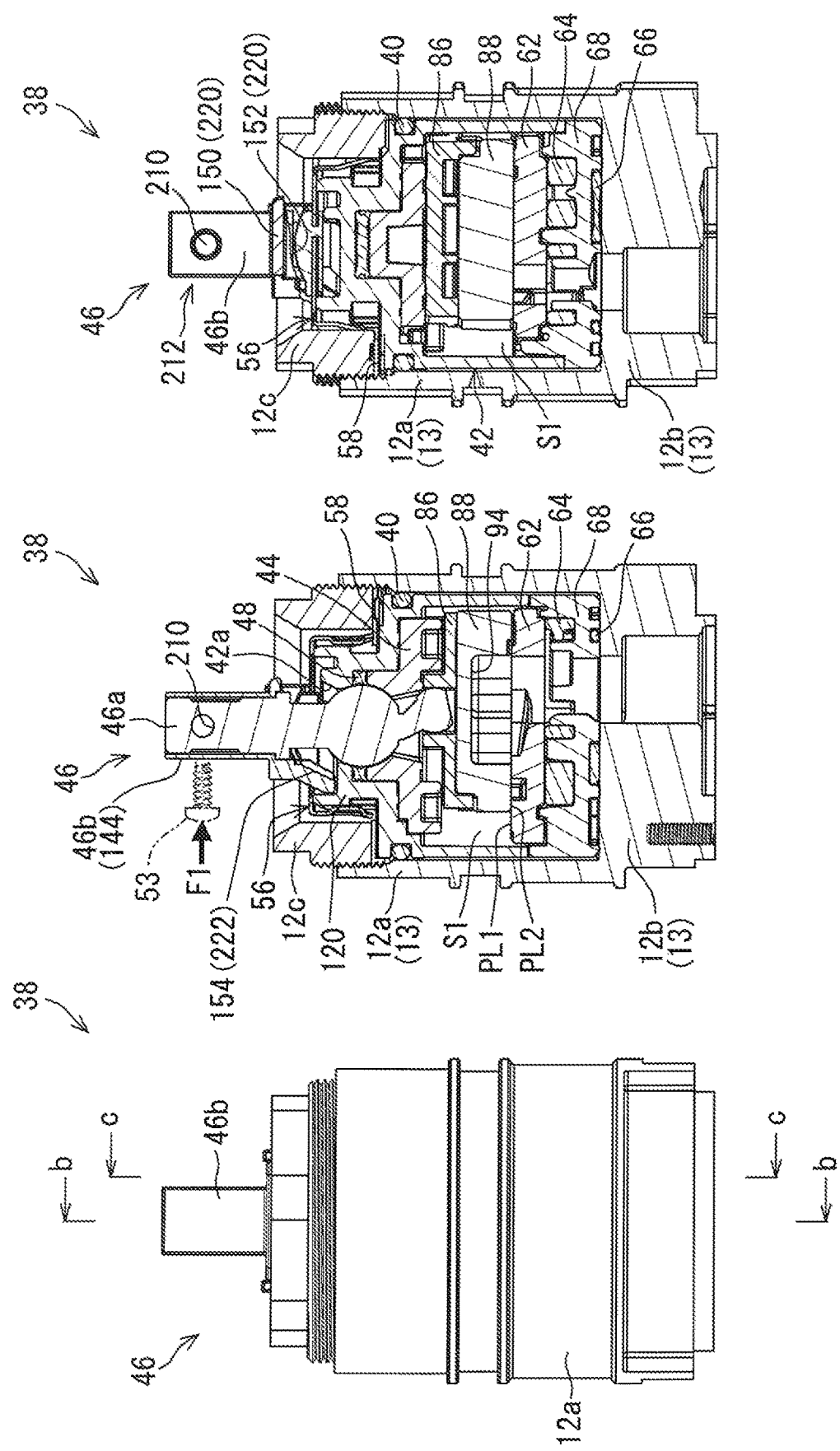
FIG. 3(a) is a side view of a valve surrounding area in which the valve assembly in FIG. 2(a) is included.
FIG. 3(b) is a cross-sectional view taken along line b-b in FIG. 3(a)
FIG. 3(c) is a cross-sectional view taken along line c-c in FIG. 3(a).

FIG. 3(a) is a side view of the valve assembly 38 in the water shut-off state and its vicinity. FIG. 3(b) is a cross-sectional view taken along line b-b in FIG. 3(a). FIG. 3(c) is a cross-sectional view taken along line c-c in FIG. 3(a).

FIG. 4(a) is a side view of the valve assembly 38 in the water discharge state (maximum water discharge state) and its vicinity. FIG. 4(b) is a cross-sectional view taken along line b-b in FIG. 4(a). FIG. 4(c) is a cross-sectional view taken along line c-c in FIG. 4(a).

The valve assembly 38 is accommodated in the faucet main body 12 of the mixer faucet 10. The faucet main body 12 includes a sidewall portion 12a and a bottom portion 12b. The sidewall portion 12a and the bottom portion 12b constitute a housing portion 13 in which the valve assembly 38 is housed. The faucet main body 12 also includes a valve fixing member 12c that holds the valve assembly 38 down from above. The valve fixing member 12c includes a male screw portion that is screw-connected to a female screw portion provided on the inner surface of the sidewall portion 12a. The valve fixing member 12c fixes the valve assembly 38 into the housing portion 13 by holding the valve assembly 38 down from above.

Figure 5:
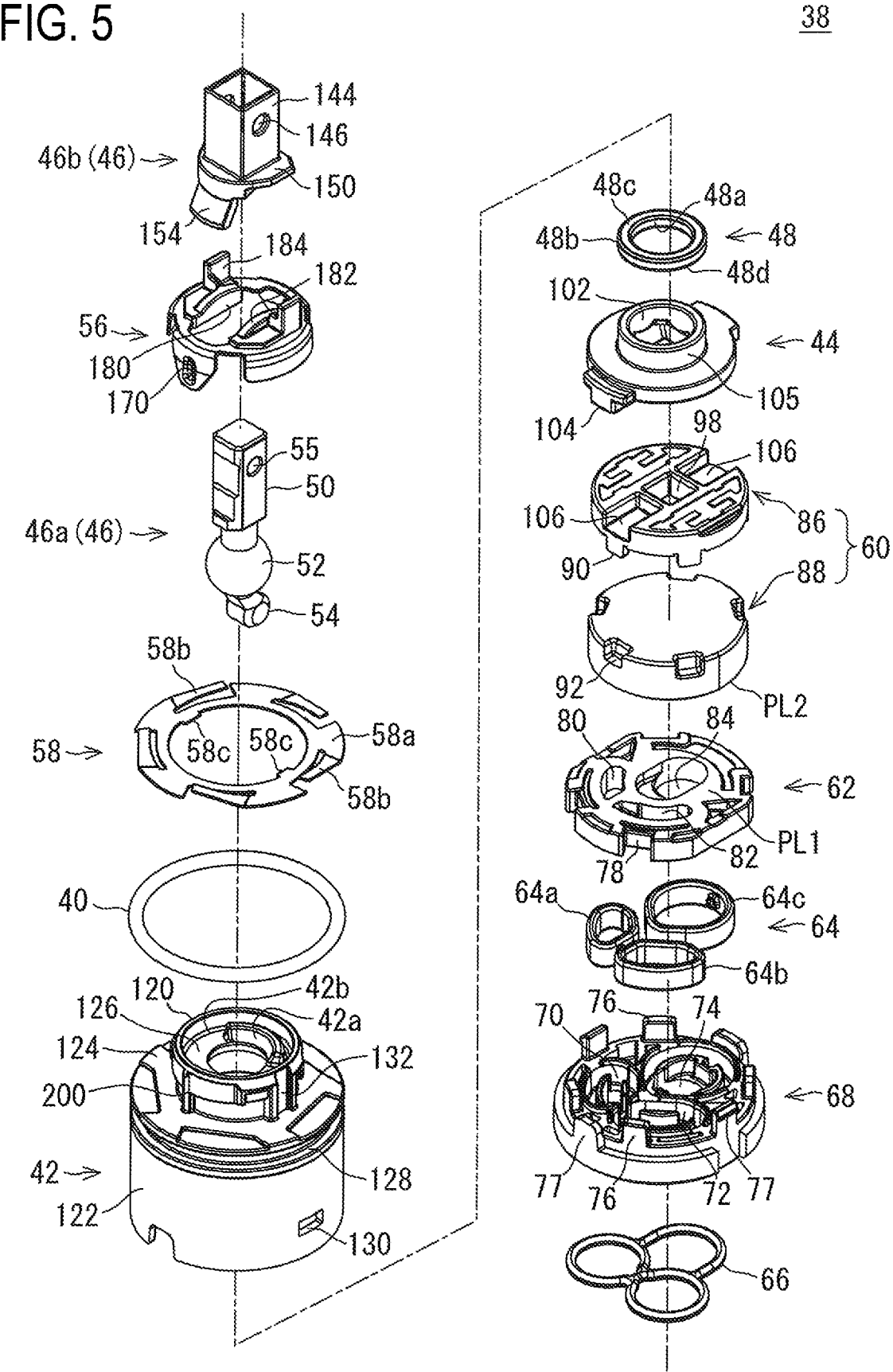
FIG. 5 is an exploded perspective view of the valve assembly.

FIG. 5 is an exploded perspective view of the valve assembly 38. As shown in FIG. 5, the valve assembly 38 includes an upper sealing member 40, an upper case 42, a rotatable body 44, a tilting lever 46, and a lever sealing member 48. The tilting lever 46 includes a lever shaft 46a and a lever cap 46b. The lever shaft 46a includes an upper portion 50, a spherical body 52 and a lower portion 54. The spherical body 52 is positioned between the upper portion 50 and the lower portion 54. The lever handle 14 is fixed to the upper portion 50.

The lever handle 14 is fixed to the tilting lever 46 with a fixing screw 53 (see FIG. 3(*b*)). Although not shown in the drawings, the lever handle 14 is provided with a lever receiving portion that has a shape corresponding to the shape of the upper portion 50 of the tilting lever 46, and a screw hole. The fixing screw 53 is screwed into the screw hole in a state where the tilting lever 46 (upper portion 50) is inserted into the lever receiving portion. The tip end of the fixing screw 53 presses the tilting lever 46 by the axial force F1 of the fixing screw 53. The pressing force fixes the lever handle 14 to the tilting lever 46. The pressing force of the fixing screw 53 also contributes to fixing the lever cap 46*b* to the lever shaft 46*a*. The fixing screw 53 also presses the lever shaft 46*a* with a cover portion 144 of the lever cap 46*b* interposed between the fixing screw 53 and the lever shaft 46*a*. As a result, of the lever cap 46*b*, a portion that is pressed by the fixing screw 53 is strongly pressed against the lever shaft 46*a*. This structure increases the force for fixing the lever cap 46*b* to the lever shaft 46*a*.

The lever shaft 46*a* includes a through hole 55. The through hole 55 is provided in the upper portion 50.

The valve assembly 38 further includes a click rotary member 56. The click rotary member 56 covers the upper portion (smaller-diameter cylindrical portion 120 to be described below) of the upper case 42.

The valve assembly 38 further includes a ratchet plate 58. The ratchet plate 58 is fixed to an upward-facing surface, which is a surface that faces upward, of the upper case 42. The ratchet plate 58 is made of a metal.

The valve assembly 38 further includes a movable valve body 60, a fixed valve body 62, an inner sealing member 64, a lower sealing member 66, and a lower case 68. The inner sealing member 64 includes a hot-water hole sealing portion 64*a*, a cold-water hole sealing portion 64*b*, and a drain hole sealing portion 64*c*. In the present embodiment, the hot-water hole sealing portion 64*a*, the cold-water hole sealing portion 64*b*, and the drain hole sealing portion 64*c* are formed separately from each other. The hot-water hole sealing portion 64*a*, the cold-water hole sealing portion 64*b*, and the drain hole sealing portion 64*c* are formed continuously with each other. In this case, the inner sealing member 64 can be a single-piece member having three annular portions.

The lower case 68 has a hot water inlet hole 70, a cold water inlet hole 72, and a discharge hole 74. The bottom portion 12*b* located on the lower side of the lower case 68 is provided with an opening corresponding to the hot water inlet hole 70, an opening corresponding to the cold water inlet hole 72, and an opening corresponding to the discharge hole 74, which are connected to the hot water inlet pipe 18, the cold water inlet pipe 20, and the discharge pipe 22, respectively. The lower sealing member 66 seals the connection portions between these three pairs of the holes 70, 72, 74 of the lower case 68 and the respective openings of the bottom portion 12*b*.

The fixed valve body 62 is located on the upper side of the lower case 68. The fixed valve body 62 is pressed against the movable valve body 60 by the inner sealing member 64 while being supported by the inner sealing member 64 from below. The lower case 68 is provided with an engaging projection 76 that prevents the fixed valve body 62 from rotating, and an engaging projection 77 that fixes the upper case 42 to the lower case 68. The fixed valve body 62 is provided with an engaging recess 78 that is engaged with the engaging projection 76.

The fixed valve body 62 includes a hot water supply hole 80, a cold water supply hole 82, and a drain hole 84. The hot water supply hole 80 penetrates through the fixed valve body 62. The hot water supply hole 80 is connected to the hot water inlet hole 70 of the lower case 68. The inner sealing member 64 (hot-water hole sealing portion 64*a*) ensures the seal tightness in this connection. The cold water supply hole 82 penetrates through the fixed valve body 62. The cold water supply hole 82 is connected to the cold water inlet hole 72 of the lower case 68. The inner sealing member 64 (cold-water hole sealing portion 64*b*) ensures the seal tightness in this connection.

The drain hole 84 penetrates through the fixed valve body 62. The drain hole 84 is connected to the discharge hole 74 of the lower case 68. The inner sealing member 64 (drain hole sealing portion 64*c*) ensures the seal tightness in this connection.

The movable valve body 60 includes an upper member 86 and a lower member 88. The upper member 86 is fixed to the lower member 88. This fixing is accomplished by engagement between a protrusion(s) 90 of the upper member 86 and a recess(es) 92 of the lower member 88. In the present embodiment, the upper member 86 and the lower member 88 are provided as separate members. When the upper member 86 and the lower member 88 are separate members, an optimum material and an optimal production method can be selected for each of the upper member 86 and the lower member 88. Alternatively, the movable valve body 60 may be integrally formed as a single-piece member.

As shown in FIG. 3(*b*) and FIG. 4(*b*), a flow path forming recess 94 is formed on the lower surface of the movable valve body 60 (the lower member 88). The flow path forming recess 94 is open downward. The upper side of the flow path forming recess 94 is closed. Although the flow path forming recess 94 in the present embodiment is a recess that is formed on the lower member 88 and has a bottom, a through hole may be provided instead of the recess. For example, a flow path forming recess can be formed by using such a through hole whose upper opening is closed by another member and a packing such as an O-ring.

As shown in FIG. 3(*b*) and FIG. 4(*b*), a first sliding surface PL1 is provided on the upper surface of the fixed valve body 62. The first sliding surface PL1 is a flat surface. The first sliding surface PL1 is formed in a portion where the holes 80, 82, and 84 are not present. On the other hand, a second sliding surface PL2 is provided on the lower surface of the lower member 88 (movable valve body 60). The second sliding surface PL2 is provided in a portion where the flow path forming recess 94 is not formed. A sliding interface PL3 is formed by a surface contact between the first sliding surface PL1 and the second sliding surface PL2. Watertightness is ensured by the sliding interface PL3.

As shown in FIG. 5, the upper surface of the upper member 86 is provided with a lever engagement recess 98 to be engaged with the lower portion 54 of the tilting lever 46 (lever shaft 46*a*). The lower portion 54 of the tilting lever 46 is inserted into the lever engagement recess 98. As described above, the lever handle 14 is fixed to the tilting lever 46. When the lever handle 14 is turned forward and rearward, the tilting lever 46 is also turned forward and rearward. This forward and rearward turning changes the inclination position of the tilting lever 46, which is also referred to as a lever tilting position in the present disclosure. When the lever handle 14 is turned leftward and rightward, the tilting lever 46 is also turned leftward and rightward. This leftward and rightward turning changes the position of the tilting lever 46 in the left-right direction, which is referred to as a left-right lever position.

The movable valve body 60 slides on the fixed valve body 62 in conjunction with the movement of the tilting lever 46. The movable valve body 60 rotates as the tilting lever 46 is turned leftward or rightward. The movable valve body 60 moves as the tilting lever 46 is turned forward or rearward, and accordingly, the flow path forming recess 94 of the movable valve body 60 also moves.

When the flow path forming recess 94 overlaps the hot water supply hole 80 and/or the cold water supply hole 82 and also overlaps the drain hole 84, a water discharge state is achieved. The water discharge state includes a mixture discharge state, a hot water discharge state, and a cold water discharge state. When the flow path forming recess 94 overlaps the hot water supply hole 80 and the cold water supply hole 82, the mixture discharge state is achieved. In the mixture discharge state, hot water from the hot water supply hole 80 and cold water from the cold water supply hole 82 are discharged in a state of being mixed together. When the flow path forming recess 94 overlaps the hot water supply hole 80 only and does not overlap the cold water supply hole 82, the hot water discharge state is achieved. In the hot water discharge state, only hot water from the hot water supply hole 80 is discharged, and cold water from the cold water supply hole 82 is not discharged. When the flow path forming recess 94 overlaps the cold water supply hole 82 only and does not overlap the hot water supply hole 80, the cold water discharge state is achieved. In the cold water discharge state, only cold water from the cold water supply hole 82 is discharged, and hot water from the hot water supply hole 80 is not discharged. When the flow path forming recess 94 does not overlap either the hot water supply hole 80 or the cold water supply hole 82, the water shut-off state is achieved.

The hot water supply hole 80 does not have a communication path that communicates with the outer edge of the fixed valve body 62. The cold water supply hole 82 does not have a communication path that communicates with the outer edge of the fixed valve body 62. The drain hole 84 does not have a communication path that communicates with the outer edge of the fixed valve body 62. The mixer faucet 10 is a dry sliding type mixer faucet. Mixer faucets are generally classified into an underwater sliding type and a dry sliding type. The underwater sliding type means a mixer faucet that is used under the condition where the sliding interface is submerged in water. The underwater sliding type mixer faucet has a water supply path that supplies water to space around the sliding interface. The above-mentioned communication path is an example of the water supply path. The mixer faucet 10 does not include such a water supply path that supplies water to space around the sliding interface PL3. In the mixer faucet 10, the sliding interface PL3 prevents water leakage to space around the sliding interface PL3. In dry sliding type mixer faucets, the sliding interface PL3 is not intentionally submerged in water.

As shown in FIG. 5, the rotatable body 44 includes a spherical body support portion 102, an engaging portion 104, and an outer circumferential surface 105. As shown in FIG. 3(*b*) and FIG. 4(*b*), the spherical body support portion 102 is a concave surface that is a part of a spherical surface, and is in surface contact with the spherical body 52 of the tilting lever 46. The engaging portion 104 is slidably attached to a slide engaging portion 106 of (the upper member 86 of) the movable valve body 60. The rotatable body 44 is supported by the upper case 42 such that the rotatable body 44 is rotatable within a predetermined angular range. The rotatable body 44 is housed inside the upper case 42. The entirety of the rotatable body 44 is located inside the upper case 42.

As shown in FIG. 3(*b*) and FIG. 4(*b*), the lever sealing member 48 is fixed by being sandwiched between the upper end surface of the rotatable body 44 and the upper case 42. The spherical body 52 of the tilting lever 46 is in tight contact with the lever sealing member 48.

Leftward and rightward turning of the lever handle 14 also causes leftward and rightward turning of the tilting lever 46. When the tilting lever 46 is turned leftward and rightward, the rotatable body 44 rotates together with the tilting lever 46, whereby the movable valve body 60 also rotates. The lever sealing member 48 also rotates as the tilting lever 46 is turned leftward or rightward. During the leftward and rightward turning movement of the tilting lever 46, the lever sealing member 48 rotates together with the spherical body 52 and thus does not slide on the spherical body 52. The lever sealing member 48 does not necessarily have to rotate as the tilting lever 46 is turned leftward or rightward. Even when the tilting lever 46 is situated at any left-right lever position, the spherical body 52 is in tight contact with the lever sealing member 48.

Forward and rearward turning of the lever handle 14 also causes forward and rearward turning of the tilting lever 46. By turning the tilting lever 46 forward and rearward, an angle of inclination of the tilting lever 46 is changed. The movable valve body 60 slides with respect to the rotatable body 44 as the tilting lever 46 is turned forward and rearward. The lever sealing member 48 slides with respect to the spherical body 52 as the tilting lever 46 is turned forward and rearward.

By turning the tilting lever 46 forward and rearward, the angle of inclination of the tilting lever 46 is changed. In the present disclosure, the position of the tilting lever 46 in the front-rear direction that is changed by changing the angle of inclination of the tilting lever 46 is also referred to as a lever tilting position. Even when the tilting lever 46 is situated at any lever tilting position, the lever sealing member 48 is in tight contact with the spherical body 52. The lever tilting position includes a water shut-off position and a maximum water discharge position. The water shut-off position means a lever tilting position when the mixer faucet 10 is in the water shut-off state. The maximum water discharge position means a lever tilting position when the amount of discharge water is at the maximum.

From the viewpoint of seal tightness, a sealed surface that is brought into tight contact with the lever sealing member 48 is preferably the surface of the spherical body 52. Alternatively, the sealed surface can be other portion than a spherical surface when a sealing member having a high followability is used.

As shown in FIG. 5, the lever sealing member 48 is an annular member having no gap. The lever sealing member 48 is an annular packing. The lever sealing member 48 includes an inner circumferential surface 48*a* and an outer circumferential surface 48*b*. The lever sealing member 48 further includes an upper surface 48*c* and a lower surface 48*d*. The outer circumferential surface 48*b* has a recess. As shown in FIG. 3(*b*) and FIG. 4(*b*), the outer circumferential surface 48*b* is in tight contact with the inner surface of the smaller-diameter cylindrical portion 120 (upper case 42). The inner circumferential surface 48*a* is in tight contact with the spherical body 52. The upper surface 48*c* is in tight contact with the upper case 42 (a seal support portion 126). The lower surface 48*d* is tight contact with the rotatable body 44.

From the viewpoint of seal tightness, the spherical body 52 is formed preferably with high accuracy. From this viewpoint, the spherical body 52 is preferably formed as a part of the lever shaft 46a. By using a metal as the material of the lever shaft 46a, the spherical body 52 can also be made of a metal. When the spherical body 52 is made of a metal, the spherical surface thereof can be formed with high accuracy by being polished, and can also be mirror-finished.

The lever sealing member 48 seals a gap between the upper case 42 and a lever interlocking portion that moves in conjunction with the movement of the tilting lever 46. In the present embodiment, the lever interlocking portion is the spherical body 52. The lever interlocking portion that is sealed by the lever sealing member 48 is not limited to the spherical body 52. The lever interlocking portion may be a part of the tilting lever 46, or may be a portion other than the tilting lever 46. For example, the lever interlocking portion that is sealed by the lever sealing member 48 may be the rotatable body 44. That is, the lever sealing member 48 may seal a gap between the upper case 42 and the rotatable body 44 and also seal a gap between the rotatable body 44 and the upper member 86.

As shown in FIG. 5, the upper case 42 includes the smaller-diameter cylindrical portion 120, a larger-diameter cylindrical portion 122, and a coupling portion 124. The smaller-diameter cylindrical portion 120 forms an upper portion of the upper case 42. The smaller-diameter cylindrical portion 120 is located on the upper side of the larger-diameter cylindrical portion 122. The coupling portion 124 extends in the radial direction of the upper case 42. The coupling portion 124 connects the smaller-diameter cylindrical portion 120 and the larger-diameter cylindrical portion 122. The coupling portion 124 is an upward-facing surface that faces upward.

The ratchet plate 58 is disposed on the upward-facing surface (coupling portion) 124 of the upper case 42. The ratchet plate 58 is an annular member that has substantially the same size as the upward-facing surface 124. As shown in FIG. 5, the ratchet plate 58 includes a base portion 58a that has an annular shape, and pawls 58b that extend from respective circumferential positions (five positions) of the base portion 58a. The pawls 58b are arranged at equal intervals in the circumferential direction of the base portion 58a. Each pawl 58b extends slopingly upward from the base portion 58a. The upper end of each pawl 58b is a free end. All the pawls 58b are formed in an equivalently balanced manner in the circumferential direction.

The base portion 58a includes an engaging portion(s) 58c (protrusion(s)). The ratchet plate 58 is placed on the upper side of the upward-facing surface 124 in a state where the engaging portion(s) 58c is/are engaged with an engaging portion(s) 132 (recess(es)) of the upper case 42. This engagement prevents the ratchet plate 58 from rotating with respect to the upper case 42.

As shown in FIG. 3(b) and FIG. 4(b), the ratchet plate 58 abuts on the bottom surface of the valve fixing member 12c. Although not shown in the drawings, a ratchet gear is formed on the bottom surface of the valve fixing member 12c. The ratchet gear is formed with a plurality of teeth that project downward and are arranged in the circumferential direction. Each tooth has a relatively gently inclined surface located on one side in the circumferential direction, and a relatively steeply inclined surface located on the other side in the circumferential direction. These two inclined surfaces intersect each other and terminate at their intersection that is a vertex of the tooth. The ratchet gear and the ratchet plate 58 constitute a ratchet mechanism that allows the valve fixing member 12c to rotate only in a tightening direction. When a force in a loosening direction is applied on the valve fixing member 12c, the pawls 58b are engaged with the teeth of the ratchet gear, whereby the rotation of the valve fixing member 12c in the loosening direction is prevented. More specifically, the tip ends of the pawls 58b abut on the relatively steeply inclined surfaces, whereby the valve fixing member 12c is prevented from rotating in the loosening direction. When the valve fixing member 12c is rotated in the tightening direction, the pawls 58b are pushed up by the vertexes of the teeth and thus the rotation in the tightening direction is not hampered.

As described above, the valve fixing member 12c includes the male screw portion, and this male screw portion is screw-connected to the female screw portion provided on the inner surface of the sidewall portion 12a (see FIG. 3(b) and FIG. 4(b)). The above-mentioned tightening direction is a direction in which this screw connection is tightened. The above-mentioned loosening direction is a direction in which this screw connection is loosened. When the valve fixing member 12c is rotated in the tightening direction, the valve fixing member 12c is moved downward and pressing force of the valve fixing member 12c against the valve assembly 38 is increased. When the valve fixing member 12c is rotated in the loosening direction, the valve fixing member 12c is moved upward and pressing force of the valve fixing member 12c against the valve assembly 38 is decreased. The ratchet mechanism prevents the valve fixing member 12c from rotating in the loosening direction. That is, the ratchet mechanism prevents the valve fixing member 12c from rotating in a direction in which the above-mentioned screw connection is loosened.

The upper case 42 includes the seal support portion 126. The seal support portion 126 is provided in the smaller-diameter cylindrical portion 120. The smaller-diameter cylindrical portion 120 has an annular shape. The seal support portion 126 is protruded from the inner surface of the smaller-diameter cylindrical portion 120 toward inside of the smaller-diameter cylindrical portion 120 in its radial direction. The upper surface 48c of the lever sealing member 48 is in contact with the lower surface of the seal support portion 126.

The larger-diameter cylindrical portion 122 includes a seal placement portion 128. The seal placement portion 128 is a circumferential groove. The seal placement portion 128 is provided on the outer circumferential surface of the larger-diameter cylindrical portion 122. The seal placement portion 128 is provided on an upper portion of the larger-diameter cylindrical portion 122. The upper sealing member 40 is disposed on the seal placement portion 128.

The larger-diameter cylindrical portion 122 includes an engaging hole 130. The engaging hole 130 is engaged with the engaging projection 77 of the lower case 68. The upper case 42 is fixed to the lower case 68 by this engagement.

Figure 6A:
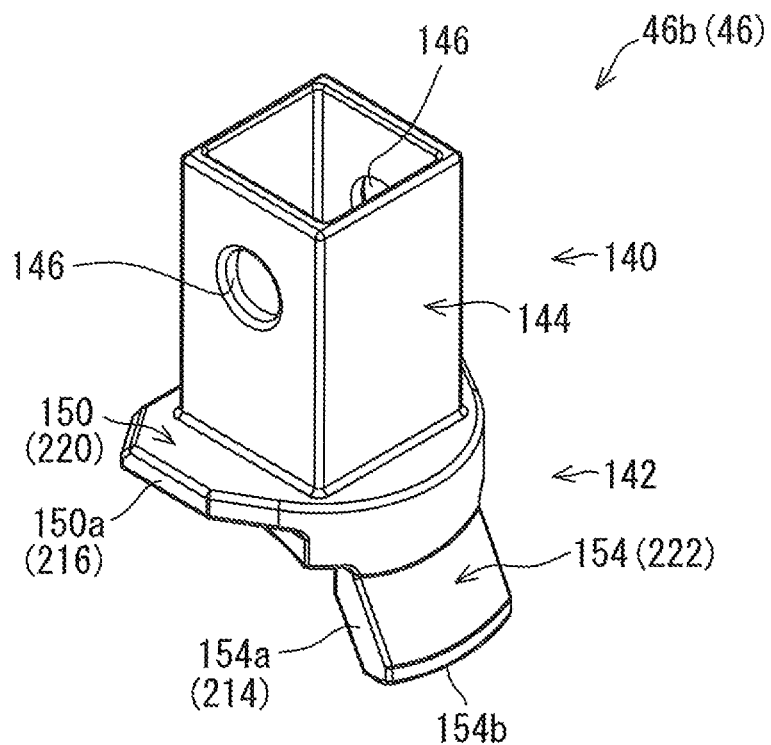
FIG. 6(a) and FIG. 6(b) are perspective views of a lever cap.
Figure 6B:
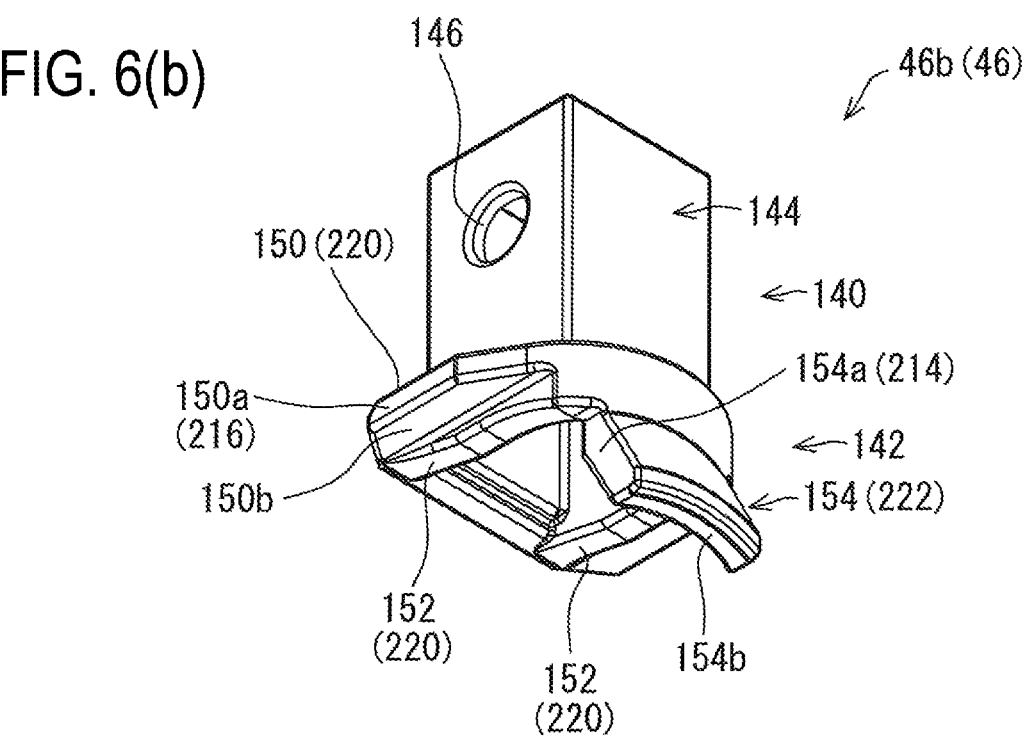

FIG. 6(a) and FIG. 6(b) show perspective views of the lever cap 46b. FIG. 6(a) shows the lever cap 46b as viewed from obliquely above. FIG. 6(b) shows the lever cap 46b as viewed from obliquely below.

The lever cap 46b is used in a state where the lever cap 46b is attached to the lever shaft 46a. The lever cap 46b includes a cap upper portion 140 and a cap lower portion 142. The cap upper portion 140 includes the cover portion 144. The inside of the cover portion 144 is an empty space. As shown in FIG. 3(b) and FIG. 4(b), the lever shaft 46a (upper portion 50) is inserted into the inside of the cover portion 144.

The cover portion 144 covers the lever shaft 46a. The cross-sectional shape of the inner surface of the cover portion 144 corresponds to the cross-sectional shape of a part of the lever shaft 46a which is inserted into the cover portion 144. The dimensions of the inner surface of the cover portion 144 is (slightly) smaller than the dimensions the part of the lever shaft 46a which is inserted into the cover portion 144. The lever shaft 46a is press-fitted into the cover portion 144. The lever shaft 46a is fitted into the inside of the cover portion 144. The cover portion 144 is fixed to the lever shaft 46a by this fitting. Furthermore, as described above, the fixing screw 53 further ensures this fixing state.

The cover portion 144 includes a through hole 146. The through hole 146 is explained below.

The cap lower portion 142 includes a flange portion 150, a bottom surface forming portion 152, and a protruded extension portion 154. The flange portion 150 extends in a direction that is perpendicular to the center axis of the cover portion 144. The flange portion 150 extends outward. The flange portion 150 includes a side surface 150a and a bottom surface 150b. The protruded extension portion 154 extends slopingly downward. The protruded extension portion 154 extends inclinedly relative to the center axis of the cover portion 144. The protruded extension portion 154 includes a side surface 154a and a tip end 154b.

The inside of the lever cap 46b is an empty space. This empty space penetrates through the cap upper portion 140 and the cap lower portion 142. This empty space is opened downward and allows the lever shaft 46a to be inserted into the inside of the cap upper portion 140.

Figure 7:
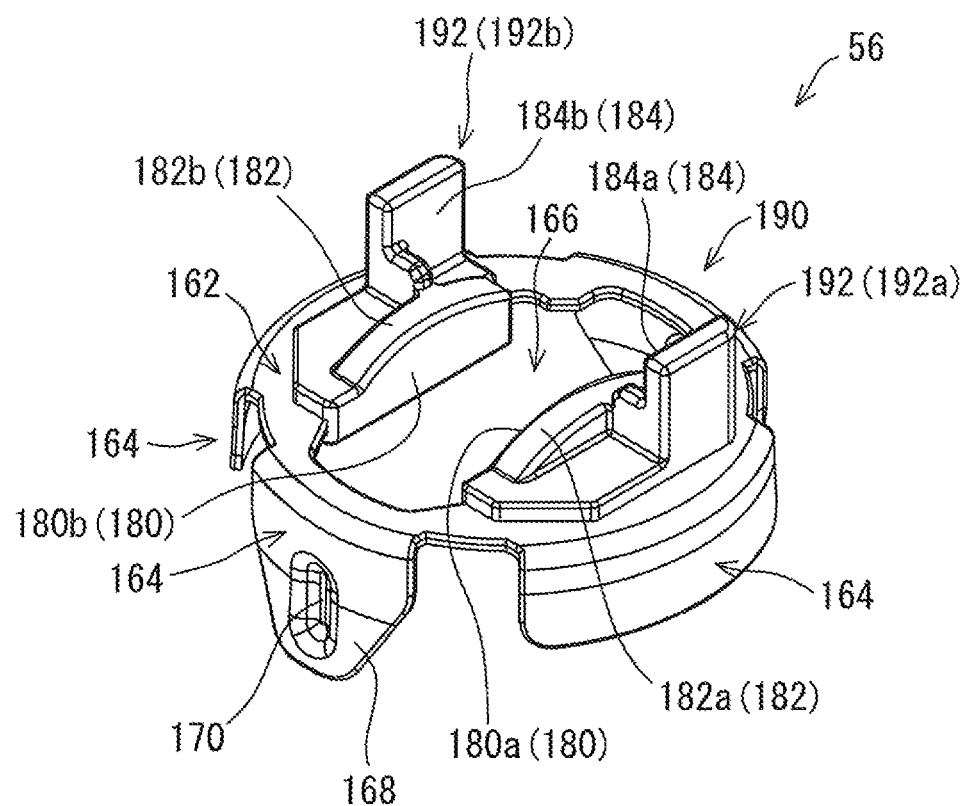
FIG. 7 is a perspective view of a click rotary member.

FIG. 7 is a perspective view of the click rotary member 56. The click rotary member 56 includes a base portion 162, a cylinder forming portion 164, a center opening 166, and a downward extension portion 168. The base portion 162 is an annular shape portion, the center of which has a through hole formed by the center opening 166. The center opening 166 is a through hole that penetrates through the click rotary member 56 in the up-down direction. The tilting lever 46 is inserted through the center opening 166.

The cylinder forming portion 164 extends downward from the circumferential edge of the base portion 162. The material of the cylinder forming portion 164 is lacking partially in the circumferential direction. The downward extension portion 168 extends downward from the circumferential edge of the base portion 162. The downward extension portion 168 is provided in the lacking portion of the cylinder forming portion 164. The downward extension portion 168 may form a part of the cylinder forming portion 164. In the present embodiment, the downward extension portion 168 is a part of the cylinder forming portion 164. The cylinder forming portion 164 has gaps on both sides of the downward extension portion 168 in the circumferential direction.

The click rotary member 56 includes a click engaging portion(s) 170. In the present embodiment, the click engaging portion 170 is an engaging projection that projects inward in the radial direction of the cylinder forming portion 164. The click engaging portion 170 is provided in the downward extension portion 168. In the present disclosure, the click engaging portion 170 provided in the click rotary member 56 is also referred to as a first click engaging portion.

The click rotary member 56 includes a first lever abutting surface 180. In the present embodiment, two first lever abutting surfaces 180 are provided. These two first lever abutting surfaces 180 face the center opening 166. The first lever abutting surfaces 180 are located on both sides (right side and left side) of the tilting lever 46.

The click rotary member 56 includes an upwardly projected curved surface 182. In the present embodiment, two upwardly projected curved surfaces 182 are provided. The upwardly projected curved surfaces 182 are located on both sides (right side and left side) of the tilting lever 46.

The click rotary member 56 includes a second lever abutting surface 184. The second lever abutting surface 184 is located on a position different from the position of the first lever abutting surface(s) 180. In the present embodiment, two second lever abutting surfaces 184 are provided. The second lever abutting surfaces 184 are located on both sides (right side and left side) of the tilting lever 46.

In the present embodiment, the click rotary member 56 is formed by combining a plurality of members. The click rotary member 56 includes a metal member 190 and a resin member 192. The resin member 192 includes a right-side resin member 192a and a left-side resin member 192b. The right-side resin member 192a and the left-side resin member 192b are formed and arranged in mirror symmetry to each other. Alternatively, the click rotary member 56 may be integrally formed as a single-piece member.

In the present disclosure, the terms "right side" and "left side" are used only for the purpose of distinguishing positions of components located on opposite sides to each other with respect to the tilting lever 46. The terms "right side" and "left side" are used as relative terms, not absolute terms.

Figure 8A:
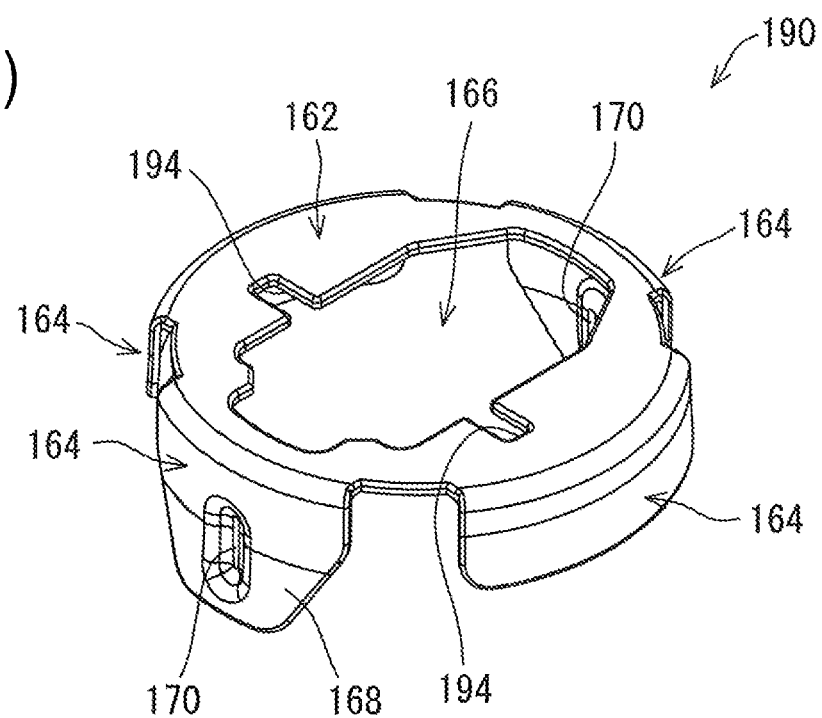
FIG. 8(a) and FIG. 8(b) are perspective views of a metal member that constitutes a part of the click rotary member.
Figure 8B:
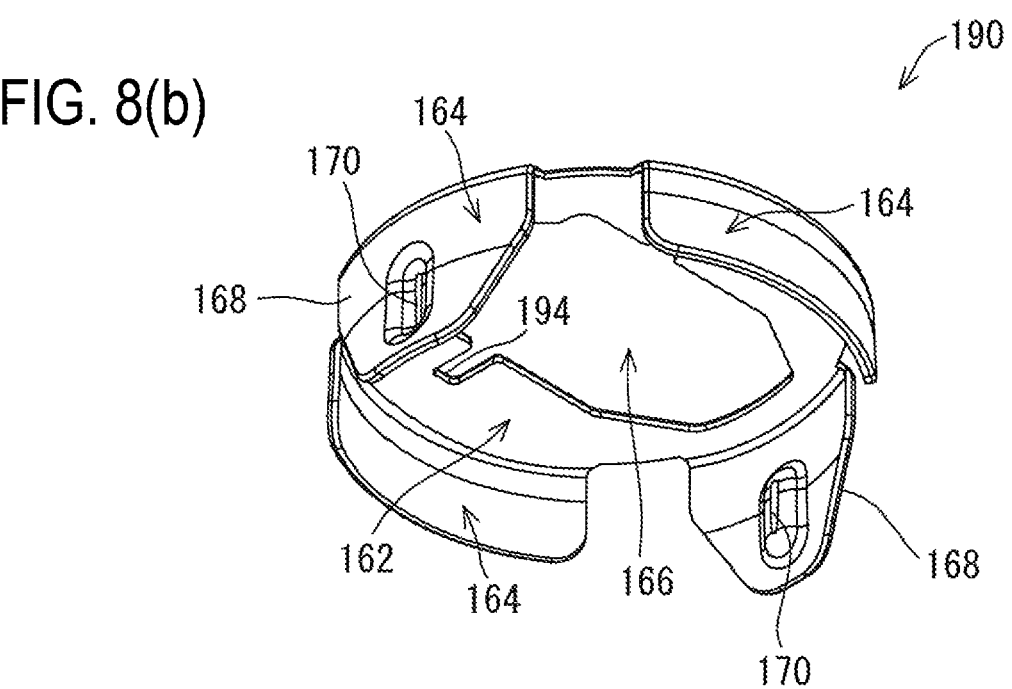

FIG. 8(a) and FIG. 8(b) are perspective views of the metal member 190. FIG. 8(a) is a perspective view of the metal member 190 as viewed from obliquely above. FIG. 8(b) is a perspective view of the metal member 190 as viewed from obliquely below.

The metal member 190 is formed by a plate material as a whole. The metal member 190 includes the above-described base portion 162 and cylinder forming portion 164. The metal member 190 also includes the downward extension portion 168. The metal member 190 also includes the first click engaging portion 170.

The resin member 192 includes the above-described first lever abutting surfaces 180, the upwardly projected curved surfaces 182, and the second lever abutting surfaces 184. The right-side resin member 192a includes a first lever abutting surface 180a on the right side, an upwardly projected curved surface 182a on the right side, and a second lever abutting surface 184a on the right side. The left-side resin member 192b includes a first lever abutting surface 180b on the left side, an upwardly projected curved surface 182b on the left side, and a second lever abutting surface 184b on the left side.

Although not shown in the drawings, the right-side resin member 192a includes a slit that has a width in the up-down direction. The base portion 162 of the metal member 190 is inserted into the slit. As a result, the base portion 162 of the metal member 190 is sandwiched by the right-side resin member 192a. In addition, a wall portion provided in the slit is inserted into an engaging recess 194 of the metal member 190. These structures fix the right-side resin member 192a to the metal member 190. The left-side resin member 192b is also fixed to the metal member 190 in the same manner as fixing the right-side resin member 192a.

Such a click rotary member 56 covers the cylindrical portion (smaller-diameter cylindrical portion 120) constituting the upper portion of the upper case 42 (see FIG. 2(a), FIG. 2(b), FIG. 3(b), and FIG. 4(b)). The base portion 162 of the click rotary member 56 is placed on the upper side of the smaller-diameter cylindrical portion 120. The cylinder forming portion 164 of the click rotary member 56 is located on the outside of the smaller-diameter cylindrical portion 120 such that the cylinder forming portion 164 is fitted along the smaller-diameter cylindrical portion 120. The cylinder forming portion 164 is guided by the smaller-diameter cylindrical portion 120, whereby the click rotary member 56 is rotated. The center of rotation of the click rotary member 56 coincides with the center line of the upper case 42 (smaller-diameter cylindrical portion 120). The tilting lever 46 penetrates through the center opening 166 of the click rotary member 56.

The rotation of the click rotary member 56 causes an engagement that generates a click. As shown in FIG. 2(*b*) and FIG. 5, a click engaging portion 200 is provided on the outer circumferential surface of the smaller-diameter cylindrical portion 120. The click engaging portion 200 provided on the upper case 42 is also referred to as a second click engaging portion. The second click engaging portion 200 is a protrusion. When the click rotary member 56 is rotated to reach a predetermined rotation position, the second click engaging portion 200 is brought into contact with the first click engaging portion 170 of the click rotary member 56. When the click rotary member 56 is further rotated, the first click engaging portion 170 climbs onto the second click engaging portion 200. The climbing of the first click engaging portion 170 onto the second click engaging portion 200 causes elastic deformation of the downward extension portion 168 in the click rotary member 56. This elastic deformation is deformation in which the click engaging portion 170 is dislocated outward in the radial direction of the cylinder forming portion 164. When the click rotary member 56 is still further rotated, the first click engaging portion 170 goes over the second click engaging portion 200. When the first click engaging portion 170 has gone over the second click engaging portion 200, the elastically deformed downward extension portion 168 is suddenly and thoroughly restored to its normal shape, whereby a click is generated. Thus, the engagement between the first click engaging portion 170 and the second click engaging portion 200 causes a click.

This click may be generated by sound or a feeling (such as vibration) transmitted to a user's hand that holds the lever handle 14. Preferably, the click includes sound (click sound) and vibration. The rotation of the click rotary member 56 is caused by leftward and rightward turning operations of the tilting lever 46. For this reason, this click is also referred to as a left-right click. The left-right click informs users that the tilting lever 46 is situated at a predetermined left-right lever position.

The left-right lever position of the tilting lever 46 when the left-right click occurs is not limited. In the above-described embodiment, when the left-right click occurs, the tilting lever 46 is situated at a left-right lever position on slightly hot water side (less than 10 degrees) relative to the front position. The left-right click informs users whether the discharged water includes hot water or not. The present embodiment includes two first click engaging portions 170 that simultaneously generate clicks at the same left-right lever position. Accordingly, the click sound becomes louder.

[Sealing Structure]

As shown in FIG. 4(*b*), the valve assembly 38 has a valve-bodies surrounding space S1 that surrounds the valve bodies. In the mixer faucet 10, the valve-bodies surrounding space S1 is a sealed space. The valve-bodies surrounding space S1 is sealed by sealing members. The valve-bodies surrounding space S1 includes a space around the sliding interface PL3. The valve-bodies surrounding space S1 includes a space around the inner sealing member 64. The valve-bodies surrounding space S1 includes a space formed between the valve assembly 38 and the housing portion 13. These spaces are continuously formed with each other with gaps between components. The valve-bodies surrounding space S1 is a space that can store water leaking from the sliding interface PL3 and water leaking from the inner sealing member 64.

The upper side of the valve-bodies surrounding space S1 is sealed by the lever sealing member 48 and the upper sealing member 40. The upper sealing member 40 seals a gap between the upper case 42 and the faucet main body 12. In the present embodiment, the upper sealing member 40 seals a gap between the upper case 42 (larger-diameter cylindrical portion 122) and the sidewall portion 12*a*. The lever sealing member 48 seals a gap between the lever interlocking portion (spherical body 52) and the upper case 42. The upper sealing member 40 and the lever sealing member 48 are positioned on the upper side with respect to the sliding interface PL3. The lever sealing member 48 located inside the valve assembly 38 and the upper sealing member 40 located outside the valve assembly 38 attain sealing on the upper side of the valve-bodies surrounding space S1.

The lower side of the valve-bodies surrounding space S1 is sealed by the inner sealing member 64 and the lower sealing member 66. The inner sealing member 64 seals a gap between the fixed valve body 62 and the lower case 68. The lower sealing member 66 seals a gap between the lower case 68 and the faucet main body 12. In the present embodiment, the lower sealing member 66 seals a gap between the lower case 68 and the bottom portion 12*b*. The inner sealing member 64 and the lower sealing member 66 are positioned on the lower side with respect to the sliding interface PL3. The inner sealing member 64 located inside the valve assembly 38 and the lower sealing member 66 located outside the valve assembly 38 attain sealing on the lower side of the valve-bodies surrounding space S1.

As explained above, the upper sealing member 40 seals the upper side gap between the valve assembly 38 and the housing portion 13 of the faucet main body 12, and the lower sealing member 66 seals the lower side gap between the valve assembly 38 and the housing portion 13 of the faucet main body 12. In addition, the lever sealing member 48 seals the gap adjacent to the lever interlocking portion. Furthermore, the inner sealing member 64 seals the gap between the fixed valve body 62 and the lower case 68. These sealing members seal the valve-bodies surrounding space S1.

In the dry sliding type mixer faucet 10, it is not preferable that water flows out from the sliding interface PL3. Water leakage from the sliding interface PL3, however, may be caused by abrasion and/or outflow of grease, for example. In addition, water leakage from the sealing members may occur due to deterioration in quality of the members. In normal dry sliding type mixer faucets, the valve-bodies surrounding space S1 is not sealed. For this reason, the leaked water fills the valve-bodies surrounding space S1, and then flows out of the faucet main body 12. The leaked water that has flowed out of the faucet main body 12 runs down along the outer wall of the mixer faucet 10, and accumulates on a root portion of the mixer faucet. The root portion of the mixer faucet means a boundary portion between the faucet main body 12 and a place where the faucet is installed (for example, a sink cabinet). The accumulated water corrodes the root portion of the mixer faucet.

In the mixer faucet 10 of the present disclosure, the valve-bodies surrounding space S1 is sealed. Accordingly, water does not flow out of the faucet main body 12.

The sealing structure isolates the valve-bodies surrounding space S1 from its outside. This structure prevents the entry of wash water used for washing the mixer faucet 10 into the valve-bodies surrounding space S1. This structure also prevents the entry of a detergent into the valve-bodies surrounding space S1. As a result, outflow of grease is suppressed.

When water at a high temperature is discharged, air in the valve-bodies surrounding space S1 and components surrounding the valve-bodies surrounding space S1 are heated and thus expanded. This expansion causes a high air pressure that pushes down the movable valve body 60. This suppresses water leakage from the sliding interface PL3 when water is discharged.

As the amount of water leaked in the valve-bodies surrounding space S1 is increased, pressure in the sealed valve-bodies surrounding space S1 is also increased. This pressure decreases difference in pressure between inside and outside of each sealing member, which suppresses the water leakage to the outside of the faucet main body 12. When the pressure in the valve-bodies surrounding space S1 is equal to the pressure of the inside of each sealing member, the difference in pressure between the inside and outside of each sealing member is eliminated, which prevents the water leakage to the outside of the faucet main body 12. When the pressure in the valve-bodies surrounding space S1 is increased, each sealing member is pressed from the inside and outside thereof to become thinner, and thus tends to expand in the up-down direction, which increases the sealing pressure. When the air pressure in the valve-bodies surrounding space S1 is equal to the water pressure of leaked water in the valve-bodies surrounding space S1, water leakage from the sliding interface PL3 is also prevented. Thus, this structure in which the valve-bodies surrounding space S1 is sealed can suppress water leakage by increase of internal pressure.

There is no limitation on the shape of the upper sealing member 40. When the upper sealing member 40 is used to seal a gap between the inner circumferential surface of the sidewall portion 12a and the outer circumferential surface of the upper case 42 as in the above-described embodiment, the upper sealing member 40 preferably has an annular shape. Examples of the annular sealing member include an O-ring and a lip seal packing. In the above-described embodiment, an O-ring is used.

There is no limitation on the shape of the lever sealing member 48. When the lever sealing member 48 is used to seal a gap adjacent to the spherical body 52 of the tilting lever 46 as in the above-described embodiment, the lever sealing member 48 preferably has an annular shape.

There is no limitation on the shape of the inner sealing member 64. As described above, the inner sealing member 64 may be constituted by three annular sealing members separated from each other as in the above-described embodiment, or alternatively, may be formed as a single-piece member in which three annular portions are integrated. When the three annular sealing members separated from each other are used as the inner sealing member 64, each annular sealing member may have a cylindrical shape. Also in the above-described embodiment, the hot-water hole sealing portion 64a, the cold-water hole sealing portion 64b, and the drain hole sealing portion 64c have respective cylindrical shapes (see FIG. 4). The inner sealing member 64 is used while being compressed between the fixed valve body 62 and the lower case 68. The presence of the inner sealing member 64 ensures a gap is formed between the fixed valve body 62 and the lower case 68. The inner sealing member 64 presses the fixed valve body 62 upward (toward the movable valve body 60) while keeping the gap between the fixed valve body 62 and the lower case 68. This pressing force of the inner sealing member 64 increases contact pressure at the sliding interface PL3, thereby suppressing water leakage from the sliding interface PL3.

There is no limitation on the shape of the lower sealing member 66. The lower sealing member 66 may be constituted by three annular sealing members separated from each other, or alternatively, may be formed as a single-piece member in which three annular portions are integrated as in the above-described embodiment.

[Easy Pull-Out Structure]

As shown in, for example, FIG. 2(a), the tilting lever 46 includes a through hole 210. The through hole 210 penetrates through the tilting lever 46. The through hole 210 is formed by the through hole 55 and the through hole 146 that are aligned to have a common axis.

The tilting lever 46 includes an exposed lever portion 212 that is exposed to the outside and upper side of the valve assembly 38. The through hole 210 is provided in the exposed lever portion 212. The inside of the through hole 210 is an empty space. Nothing is disposed in the through hole 210. The through hole 210 is provided for allowing users to pull out the valve assembly 38. The through hole 210 is not used for any purpose other than the purpose for pulling out the valve assembly 38.

Figure 9A:
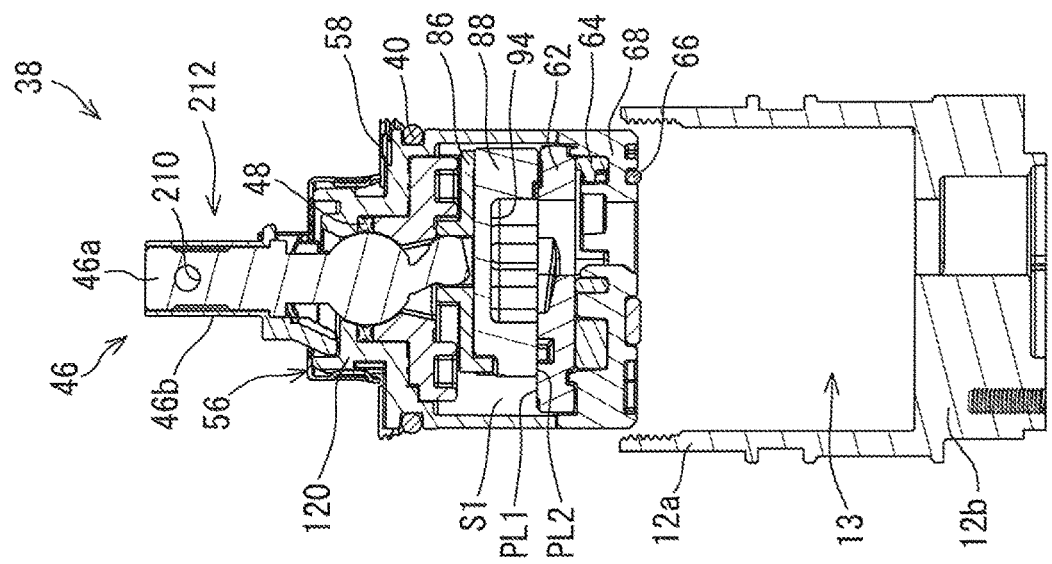
FIG. 9(a) is a cross-sectional view showing a state where the valve assembly is disposed in a housing portion.
Figure 9B:
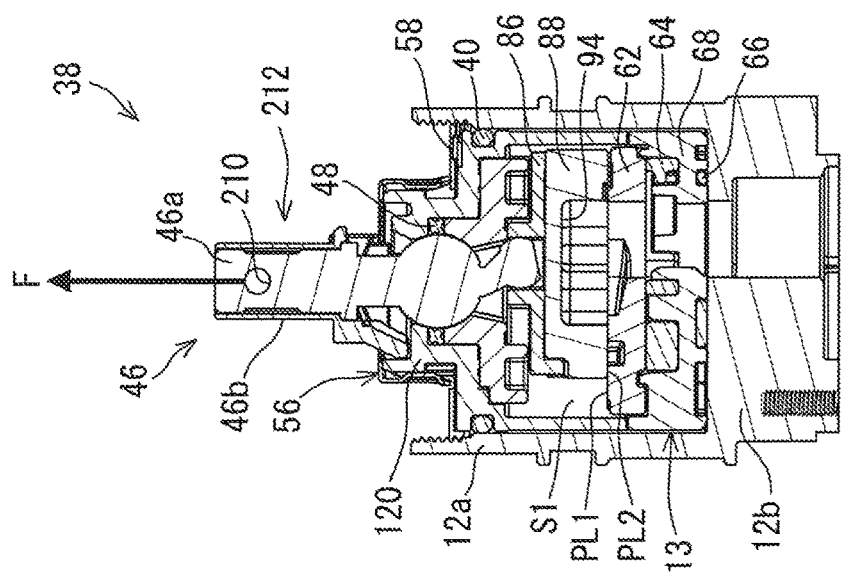
FIG. 9(b) is a cross-sectional view showing a state where the valve assembly is removed from the housing portion.

FIG. 9(a) and FIG. 9(b) are cross-sectional views showing steps of pulling out the valve assembly 38. When the valve assembly 38 is substituted by a new one, the used valve assembly 38 is detached from the faucet main body 12. For detaching the used valve assembly 38, the lever handle 14 is first detached from the tilting lever 46. Next, the valve fixing member 12c is detached. After these steps, the valve assembly 38 is in a state shown in FIG. 9(a). In this state, the valve assembly 38 is housed in the housing portion 13. Users can only hold the exposed lever portion 212 of the tilting lever 46 for pulling up the valve assembly 38.

However, it is not easy to pick the exposed lever portion 212 and pull up the valve assembly 38. Because of use of the faucet for a long period of time, sealing members are adhered to their adjacent component(s). In the state of FIG. 9(a), the lower sealing member 66 can adhere to its adjacent component(s). For pulling up the valve assembly 38, an upward force F that is greater than the adhering force is required. The exposed portion of the tilting lever 46, however, is thin and short. The exposed portion of the tilting lever 46 is difficult to hold. Accordingly, the valve assembly 38 is difficult to pull up.

The valve assembly 38 also includes the upper sealing member 40 in addition to the lower sealing member 66. The upper sealing member 40 can also adhere to its adjacent component(s). Therefore, a further greater upward force F is required.

For resolving the difficulty of pulling up the valve assembly 38, the through hole 210 is provided in the present embodiment. The valve assembly 38 is easily pulled up by putting a tool or a thread, for example, through the through hole 210 (this advantageous effect is referred to as easy taking out operation effect). Examples of the tool include a hexagonal wrench.

The cross-sectional shape of the through hole 210 may be a circle or may be a shape other than a circle. From the viewpoint of facilitating the pulling up operation, the length of the longest transversal line of the cross section of the through hole 210 is preferably greater than or equal to 1 mm, more preferably greater than or equal to 2 mm, and still more preferably greater than or equal to 3 mm. From the viewpoint of the dimensions and strength of the tilting lever 46, the length of the longest transversal line of the cross section of the through hole 210 is preferably less than or equal to 5 mm, more preferably less than or equal to 4.5 mm, and still more preferably less than or equal to 4 mm. For example, when the cross-sectional shape of the through hole 210 is a circle, the length of the longest transversal line means the length of the diameter of the circle. For example, when the cross-sectional shape of the through hole 210 is a square, the length of the longest transversal line is the length of the diagonal line of the square.

[A Left-Right Clicking Mechanism Enabling a Faucet to have a High Degree of Freedom in its Structure]

In the present embodiment, the tilting lever 46 applies a rotating force to the click rotary member 56, which rotates the click rotary member 56 (leftward or rightward). The tilting lever 46 directly abuts on the click rotary member 56, and this abutment allows the tilting lever 46 to apply the rotating force to the click rotary member 56. Accordingly, the click rotary member 56 does not have to be rotated by the rotatable body 44. Since it is not necessary to expose the rotatable body 44 to the upper side of the valve assembly 38, the degree of freedom in the design of the valve assembly 38 is improved. This structure achieves the sealed structure using the upper sealing member 40, for example.

[Exposed Click Rotary Member]

When a clicking mechanism is located inside the valve assembly 38, users cannot hear click sound well. In contrast, the click rotary member 56 is exposed from the valve assembly 38. That is, as shown in FIG. 2(*a*) and FIG. 2(*b*), in the state of the valve assembly 38, the click rotary member 56 having a clicking mechanism is exposed to the outside. For this reason, audible click sound becomes louder, whereby clearness of the left-right click is increased (this advantageous effect is referred to as a first click sound volume increase effect).

The above-described sealed structure exhibits high sound insulation. When a clicking mechanism is provided inside the sealed structure, click sound is absorbed in the structure, which reduces the volume of the click sound. In the above-described embodiment, the clicking mechanism is exposed while the sealed structure is adopted. For this reason, the volume of the click sound can be increased (this advantageous effect is referred to as a second click sound volume increase effect).

In the above-described embodiment, the tilting lever 46, not the rotatable body 44, transmits rotation to the click rotary member 56. For this reason, the click rotary member 56 that achieves the left-right click can be exposed without the need of exposing the rotatable body 44 (this advantageous effect is referred to as tilting-lever rotation-transmission effect).

[Reliability of Rotation Transmission Achieved by Two Abutment Portions]

In the above-described embodiment, two abutment portions transmit the rotation (leftward and rightward turning) of the tilting lever 46. That is, the tilting lever 46 includes a first abutment portion 214 that transmits the rotation force to the click rotary member 56, and a second abutment portion 216 that is located at a position different from the first abutment portion 214 and also transmits the rotation force to the click rotary member 56. The first abutment portion 214 directly abuts on the click rotary member 56 and transmits the rotation force to the click rotary member 56. The second abutment portion 216 directly abuts on the click rotary member 56 and transmits the rotation force to the click rotary member 56.

In the present embodiment, the first abutment portion 214 is the side surface 154*a* of the protruded extension portion 154 (see FIG. 2(*a*) and FIG. 2(*b*)). The first abutment portion 214 abuts on the first lever abutting surfaces 180 (see FIG. 7), thereby transmitting the rotation force to the click rotary member 56. In the above-described embodiment, the second abutment portion 216 is the side surface 150*a* of the flange portion 150 (see FIG. 2(*a*) and FIG. 2(*b*)). The second abutment portion 216 abuts on the second lever abutting surfaces 184 (see FIG. 7), thereby transmitting the rotation force to the click rotary member 56. These two abutment portions surely transmit the rotation force of the tilting lever 46 to the click rotary member 56 (this advantageous effect is referred to as stable rotation effect).

It should be noted that this rotation transmission is achieved in both leftward and rightward turnings of the tilting lever 46. With reference to FIG. 7, when the tilting lever 46 is turned in a first direction, the rotation force of the tilting lever 46 is received by the first lever abutting surface 180*a* located on the right side and the second lever abutting surface 184*b* located on the left side of the click rotary member 56. When the tilting lever 46 is turned in a second direction, the rotation force of the tilting lever 46 is received by the first lever abutting surface 180*b* located on the left side and the second lever abutting surface 184*a* located on the right side of the click rotary member 56. Surfaces that receive the rotation force are located apart from each other on the left side and right side with respect to the tilting lever 46, which enables the rotation force to be transmitted further stably and surely (this advantageous effect is referred to as left-right dispersion effect). The turning in first direction means turning in either leftward or rightward. The turning in the second direction means turning in the opposite direction to the first direction.

As described above, the click rotary member 56 receives the rotation force with the first lever abutting surfaces 180 and the second lever abutting surfaces 184. The point of application of the rotation force actually applied on one of the first lever abutting surfaces 180 in a turning operation of the tilting lever 46 is referred to as a first application point. The point of application of the rotation force actually applied on one of the second lever abutting surfaces 184 in the same turning operation is referred to as a second application point. As discussed above, these application points are dispersedly located on the left side and right side of the tilting lever 46. These application points are dispersedly located also in the circumferential direction. Because of such an arrangement of the application points dispersed in the circumferential direction, the rotation of the tilting lever 46 is transmitted further stably and surely (this advantageous effect is referred to as circumferential direction dispersion effect). The position of the first application point in the circumferential direction with respect to the center line of rotation of the click rotary member 56 is different from the position of the second application point in the circumferential direction with respect to the center line of rotation of the click rotary member 56 by preferably greater than or equal to 110°, more preferably greater than or equal to 120°, still more preferably greater than or equal to 130°, and yet still more preferably greater than or equal to 140°. This difference between the positions of the first application point and the second point in the circumferential direction is less than or equal to 180°. In the above-described embodiment, the difference between the positions of the first application point and the second point in the circumferential direction varies depending on the lever tilting position, and is 151.5° at its maximum.

[Rotation Transmissibility at any Lever Tilting Position]

As described above, FIG. 2(a) shows a water shut-off state, and FIG. 2(b) shows a water discharge state. In FIG. 2(b), the amount of discharge water is at the maximum. FIG. 2(a) and FIG. 2(b) show respective limit positions of the movable range of the lever tilting position. The movable range of the lever tilting position is from the position shown in FIG. 2(a) to the position shown in FIG. 2(b).

At the lever tilting position in FIG. 2(a), the rotation (leftward and rightward turning) of the tilting lever 46 is transmitted to the click rotary member 56. As described above, this rotation transmission is achieved by two abutment portions (first abutment portion 214 and second abutment portion 216). Also at the lever tilting position in FIG. 2(b), the rotation (leftward and rightward turning) of the tilting lever 46 is transmitted to the click rotary member 56. As described above, this rotation transmission is also achieved by two abutment portions (first abutment portion 214 and second abutment portion 216). Even when the tilting lever 46 is situated at any tilting position in the movable range, the rotation of the tilting lever 46 is transmitted to the click rotary member 56 by two abutment portions (first abutment portion 214 and second abutment portion 216). Regardless of the lever tilting position, when the tilting lever 46 is turned, the click rotary member 56 is also rotated (this advantageous effect is referred to as rotation transmissibility at any lever tilting position). The left-right click is generated even when the tilting lever 46 is situated at any tilting position.

As to the first abutment portion 214, the side surface 154a of the protruded extension portion 154 can abut on one of the first lever abutting surfaces 180 even when the tilting lever 46 is situated at any tilting position. Accordingly, the first abutment portion 214 of the tilting lever 46 transmits the rotation force regardless of the lever tilting position. In addition, as to the second abutment portion 216, the side surface 150a of the flange portion 150 can abut on one of the second lever abutting surfaces 184 even when the tilting lever 46 is situated at any tilting position. Accordingly, the second abutment portion 216 of the tilting lever 46 transmits the rotation force regardless of the lever tilting position.

In the present embodiment, the first abutment portion 214 (side surface 154a) and the second abutment portion 216 (side surface 150a) of the tilting lever 46 are different surfaces from each other. Alternatively, the first abutment portion 214 and the second abutment portion 216 may be different positions on a single flat surface.

[Rotation Transmission in the Sealed Structure]

As described above, the valve assembly 38 has the sealed structure. As shown in FIG. 3(b) and FIG. 4(b), the rotatable body 44 is located on the lower side of the lever sealing member 48. The rotatable body 44 is not exposed to the outside of the valve assembly 38. The rotatable body 44 is located inside the sealed area. As described above, in the present embodiment, the tilting lever 46 transmits the rotation force to the click rotary member 56. Accordingly, the rotatable body 44 does not have to transmit the rotation force to the click rotary member 56. Therefore, the rotatable body 44 does not have to be exposed, which makes easy to form the sealed structure (this advantageous effect is referred to as effect of easily forming the sealed structure).

[Retention of the Click Rotary Member 56]

As described above, the click rotary member 56 is placed on the upper side of the smaller-diameter cylindrical portion 120. The click rotary member 56 is guided by the smaller-diameter cylindrical portion 120 to rotate. The click rotary member 56, however, is simply placed on and is not fixed to the smaller-diameter cylindrical portion 120. This unfixed state facilitates a slight vibration of the click rotary member 56 in addition to the rotation of the click rotary member 56. This slight vibration increases the sound pressure of click sound (this advantageous effect is referred to as a third click sound volume increase effect). However, the click rotary member 56 is not fixed, and thus could easily fall off from the smaller-diameter cylindrical portion 120.

In the present embodiment, the click rotary member 56 is effectively prevented from falling off. As shown in FIG. 6, the tilting lever 46 (lever cap 46b) includes the flange portion 150 and the bottom surface forming portion 152. At least a part of these portions is located on the upper side of the click rotary member 56 (upwardly projected curved surfaces 182) (see FIG. 2(a), FIG. 2(b), FIG. 3(c), and FIG. 4(c)). Even when the tilting lever 46 is situated at any lever tilting position, at least a part of the tilting lever 46 (lever cap 46b) is located on the upper side of the click rotary member 56. That is, the tilting lever 46 (lever cap 46b) includes a click retention portion 220 that is located on the upper side of the click rotary member 56 regardless of the lever tilting position. In the present embodiment, the flange portion 150 and the bottom surface forming portion 152 are the click retention portion 220 (see FIG. 3(c), FIG. 4(c), and FIG. 6(b)).

The bottom surface forming portion 152 which is the click retention portion 220 is located on the upper side of the upwardly projected curved surfaces 182. The bottom surface forming portion 152 has a curved surface that curves along the upwardly projected curved surfaces 182 (see FIG. 3(c) and FIG. 4(c)). The distance in the up-down direction of a gap formed between the bottom surface forming portion 152 and the upwardly projected curved surfaces 182 is unvarying even when the tilting lever 46 is situated at any lever tilting position.

A (slight) gap is formed between the click retention portion 220 and the upper surface (for example, upwardly projected curved surfaces 182) of the click rotary member 56. Accordingly, the click retention portion 220 is not brought into contact with the click rotary member 56, whereby the click retention portion 220 cannot increase a required force for operating the lever. If the click rotary member 56 is moved upward for some reason, the upwardly moved click rotary member 56 comes into contact with the click retention portion 220, which prevents the click rotary member 56 from falling off (this advantageous effect is referred to as click rotary member retention effect).

[Prevention of Over-Tilting of the Tilting Lever 46]

When a user operates the lever handle 14 with excessively great force, an excessively great load can be applied to the tilting lever 46 at the limit positions of the movable range of the lever tilting position. The present embodiment includes a structure that handles this situation. As shown in FIG. 6(a) and FIG. 6(b), the lever cap 46b (tilting lever 46) includes the protruded extension portion 154. As shown in FIG. 3(b), when the lever tilting position is situated at the water shut-off position, the protruded extension portion 154 abuts on the upper case 42 (smaller-diameter cylindrical portion 120). More specifically, the tip end 154b of the protruded extension portion 154 abuts on the upper case 42 (smaller-diameter cylindrical portion 120). This abutment prevents the tilting lever 46 from over-tilting (this advantageous effect is referred to as a first over-tilting prevention effect). The water shut-off position is one of the limit positions of the movable range of the lever tilting position. The protruded extension portion 154 is an over-tilting prevention portion 222 that abuts on the upper case 42 when the lever tilting position is situated at this limit position.

The limit positions of the movable range of the lever tilting position are the water shut-off position and the maximum water discharge position. As described above, the over-tilting prevention portion 222 abuts on the upper case 42 at the water shut-off position. As shown in FIG. 5, the upper case 42 includes an inner corner portion 42b. The inner corner portion 42b is a corner portion formed by the upper surface of the seal support portion 126 and the inner circumferential surface of the smaller-diameter cylindrical portion 120 intersecting with each other. The tip end (tip end 154b) of the over-tilting prevention portion 222 abuts on the inner corner portion 42b. The inner corner portion 42b stably supports the over-tilting prevention portion 222.

The over-tilting prevention portion 222 functions even when the tilting lever 46 is situated at any left-right lever position. As shown in FIG. 5, the inner corner portion 42b extends in the circumferential direction and is formed within a predetermined range. The inner corner portion 42b can abut on the over-tilting prevention portion 222 even when the tilting lever 46 is situated at any left-right lever position.

At the maximum water discharge position, the upper case 42 abuts on the tilting lever 46 (lever shaft 46a) (see FIG. 4(b)). The upper case 42 includes an over-tilting prevention abutting surface 42a that abuts on the tilting lever 46 (lever shaft 46a) when the lever tilting position is situated at this limit position. This abutment prevents the tilting lever 46 from over-tilting (this advantageous effect is referred to as a second over-tilting prevention effect). The over-tilting prevention abutting surface 42a is oriented (inclined) so as to be in surface contact with the tilting lever 46 when the tilting lever 46 is situated at the maximum water discharge position.

The over-tilting prevention abutting surface 42a functions even when the tilting lever 46 is situated at any left-right lever position. As shown in FIG. 5, the over-tilting prevention abutting surface 42a extends in the circumferential direction and is formed within a predetermined range. The over-tilting prevention abutting surface 42a can abuts on the tilting lever 46 (lever shaft 46a) even when the tilting lever 46 is situated at any left-right lever position.

[Retention of the Ratchet Plate 58]

As described above, the ratchet plate 58 is placed on the upper side of the upward-facing surface 124 of the upper case 42 (see FIG. 5, FIG. 2(a), and FIG. 2(b)). Since the ratchet plate 58 is simply placed on the upward-facing surface 124, the ratchet plate 58 might fall off from the valve assembly 38. Once the valve assembly 38 has been attached to the faucet main body 12, the presence of the valve fixing member 12c prevents the ratchet plate 58 from falling off from the valve assembly 38. However, when the valve assembly 38 is in a solitary state, or when the valve fixing member 12c is detached, there is concern about falling off of the ratchet plate 58.

In the present embodiment, the click rotary member 56 includes a ratchet retaining portion 226. In the valve assembly 38, the downward extension portion 168 also serves as the ratchet retaining portion 226. The ratchet retaining portion 226 (downward extension portion 168) is located on the upper side of the ratchet plate 58. When the ratchet plate 58 is moved upward, the ratchet plate 58 comes into contact with the lower end of the downward extension portion 168, which prevents the further moving of the ratchet plate 58. The ratchet retaining portion 226 (downward extension portion 168) prevents the ratchet plate 58 from falling off (this advantageous effect is referred to as ratchet plate retention effect).

The leftward and rightward turning of the tilting lever 46 rotates the click rotary member 56. When the click rotary member 56 rotates, the downward extension portion 168 also moves in the circumferential direction. Even when the downward extension portion 168 is located at any position in the circumferential direction, the downward extension portion 168 is located on the upper side of the ratchet plate 58. That is, the ratchet retaining portion 226 (downward extension portion 168) is located on the upper side of the ratchet plate 58 even when the tilting lever 46 is situated at any left-right lever position. Accordingly, the ratchet plate 58 is prevented from falling off even when the tilting lever 46 is situated at any left-right lever position.

[Structure of the Tilting Lever 46]

The tilting lever 46 may be integrally formed as a single-piece member. In the above-described embodiment, the tilting lever 46 is formed by combining the lever shaft 46a and the lever cap 46b. This structure allows the designer to select respective appropriate materials and manufacturing methods for the lever shaft 46a and the lever cap 46b. When the lever cap 46b is made of a resin, the lever cap 46b can be easily formed even when it has an intricate shape. This enables the lever cap 46b including the first abutment portion 214, the second abutment portion 216, the click retention portion 220, and the over-tilting prevention portion 222 to be easily formed. From this viewpoint, the lever cap 46b preferably includes the first abutment portion 214 and the second abutment portion 216. From this viewpoint, the lever cap 46b preferably includes the click retention portion 220. From this viewpoint, the lever cap 46b preferably includes the over-tilting prevention portion 222.

The valve assembly 38 can be easily assembled by using the lever shaft 46a and the lever cap 46b. The method for manufacturing (method for assembling) the valve assembly 38 can include the following first step and second step.

(1) The first step is a step of passing the lever shaft 46a to which the lever cap 46b is not yet attached through the center opening 166 of the click rotary member 56 from the lower side of the center opening 166.

(2) The second step is a step of attaching the lever cap 46b to the lever shaft 46a from the upper side of the lever shaft 46a after the lever shaft 46a has been protruded to the upper side of the center opening 166 by the first step.

The first step and the second step allow the manufacturer to dispose the lever cap 46b on the upper side of the click rotary member 56 without the need of passing the lever cap 46b through the center opening 166. The lever cap 46b can be attached to the lever shaft 46a from above. Accordingly, these steps enable the manufacturer to easily attain the structure in which the click retention portion 220 is located on the upper side of the click rotary member 56 (this advantageous effect is referred to as easy assembling effect). Also from this viewpoint, the lever cap 46b preferably includes the click retention portion 220.

Examples of the material of the upper case include resins and metals. Examples of the resins include fiber reinforced resins. From the viewpoint of durability against the pressing force applied by the valve fixing member, a material having a high rigidity and a high strength is preferable. From this viewpoint, a polyphenylene sulfide (PPS) resin is particularly preferable.

Examples of the material of the lever cap 46*b* include resins (including fiber reinforced resins) and metals. From the viewpoint of formability of a thin wall portion, a resin is preferable, and a polypropylene (PP) resin is particularly preferable. In the above-described embodiment, a PP resin is used.

Examples of the material of the lever shaft 46*a* include resins (including fiber reinforced resins), metals, and ceramic materials. From the viewpoint of strength against user's operating force, a metal is preferable. Also considering rust that might be caused by water splashed on the lever shaft, stainless steel is more preferable. In the above-described embodiment, SUS304 is used.

Examples of the material of the click rotary member 56 include resins and metals. From the viewpoint of click sound, the materials of the base portion 162 and the downward extension portion 168 are preferably metals. Accordingly, when the click rotary member is integrally formed as a single-piece member, the material of the click rotary member is preferably a metal. From the viewpoint of rust resistance, the metal is preferably stainless steel. In the above-described embodiment, SUS304 is used.

In the above-described embodiment, the click rotary member 56 is constituted by the metal member 190 and the resin member 192. This structure allows portions (the downward extension portion 168 and the base portion 162) that are elastically deformed for the engagement causing a click to be made of a metal, and a portion having a complex shape to be made of a resin having a high formability. In addition, in the above-described embodiment, the resin member 192 is divided into the right-side resin member 192*a* and the left-side resin member 192*b*. This achieves a structure in which only a portion that requires a high formability can be made of a resin, and the metal member 190 can have an annular shape. From the viewpoint of productivity, the metal member 190 is preferably produced by drawing process.

The click rotary member 56 is produced by being assembled. That is, the click rotary member 56 is formed by assembling the metal member 190 and the resin member 192. From the viewpoint of omitting the assembling step, the click rotary member 56 may be produced by double molding process. However, in the above-described embodiment, the double molding process is not adopted. Since the metal member 190 is a thin member, the double molding process causes deformation (undulation) to the base portion 162 due to pressure generated by forming the resin member. As a result, the double molding process can cause problems such as deformation in the final product, and/or flash of resin. From this viewpoint, the click rotary member 56 is preferably formed by being assembled.

Examples of the material of the lever sealing member 48 include resins and rubber materials (elastic rubber materials). From the viewpoint of adhesiveness to the spherical body 52, rubber materials are preferable. Examples of preferable rubber materials include silicone rubber, nitrile rubber (NBR), and ethylene propylene diene monomer rubber (EPDM). In the above-described embodiment, a rubber (EPDM) is used.

Examples of the material of the upper sealing member 40 include resins and rubber materials (elastic rubber materials). From the viewpoint of seal tightness, rubber materials are preferable. In the above-described embodiment, a rubber is used.

Examples of the material of the inner sealing member 64 include resins and rubber materials (elastic rubber materials). From the viewpoint of seal tightness, rubber materials are preferable. In the above-described embodiment, a rubber is used.

Examples of the material of the lower sealing member 66 include resins and rubber materials (vulcanized rubber materials). From the viewpoint of seal tightness, rubber materials are preferable. In the above-described embodiment, a rubber is used.

Regarding the above-described embodiments, the following clauses are disclosed.

[Clause 1] A mixer faucet including:
  a faucet main body;
  a lever handle that is configured to turn forward and rearward and also turn leftward and rightward; and
  a valve assembly that is housed inside the faucet main body, wherein the valve assembly includes:
    a fixed valve body that has a hot water supply hole, a cold water supply hole, and a drain hole;
    a movable valve body that has a flow path forming recess and that is configured to move on the fixed valve body;
    a tilting lever that is configured to: move in conjunction with a movement of the lever handle, turn forward and rearward to change a lever tilting position, and turn leftward and rightward to change a left-right lever position;
    a lower case that is disposed on a lower side of the fixed valve body and has a hot water inlet hole, a cold water inlet hole, and a discharge hole;
    an upper case that is fixed to the lower case, the upper case and the lower case constituting an outer surface of the valve assembly;
    a lower sealing member that seals a gap between the lower case and the faucet main body;
    an inner sealing member that is disposed between the fixed valve body and the lower case, and that seals a gap between the hot water supply hole and the hot water inlet hole, a gap between the cold water supply hole and the cold water inlet hole, and a gap between the drain hole and the discharge hole; and
    a click rotary member that is exposed to an outside of the valve assembly and is configured to be rotated leftward and rightward by a rotation force applied from the tilting lever, wherein
  the click rotary member includes a first click engaging portion,
  the upper case includes a second click engaging portion, and
  an engagement between the first click engaging portion and the second click engaging portion generates a left-right click.

[Clause 2] The mixer faucet according to clause 1, wherein the mixer faucet further includes:
  an upper sealing member that seals a gap between the upper case and the faucet main body; and
  a lever sealing member that seals a gap between the upper case and a lever interlocking portion that moves in conjunction with a movement of the tilting lever.

[Clause 3] The mixer faucet according to clause 2, wherein the tilting lever includes a spherical body, and
  the lever sealing member seals a gap between the upper case and the spherical body.

[Clause 4] The mixer faucet according to any one of clauses 1 to 3, wherein
  the tilting lever includes a lever shaft and a lever cap that is attached to the lever shaft.

[Clause 5] The mixer faucet according to clause 4, wherein
the mixer faucet further includes a fixing screw that fixes the lever handle to the tilting lever,
the lever cap includes a cover portion that covers the lever shaft, and
the fixing screw presses the lever shaft with the cover portion interposed between the fixing screw and the lever shaft.

[Clause 6] The mixer faucet according to any one of clauses 1 to 5, wherein
the tilting lever includes: a first abutment portion that transmits the rotation force to the click rotary member; and a second abutment portion that is located at a position different from the first abutment portion and also transmits the rotation force to the click rotary member.

[Clause 7] The mixer faucet according to any one of clauses 1 to 6, wherein
the tilting lever includes a click retention portion that is located on an upper side of the click rotary member regardless of the lever tilting position.

[Clause 8] The mixer faucet according to any one of clauses 1 to 7, wherein
the tilting lever includes an over-tilting prevention portion that abuts on the upper case when the lever tilting position is situated at a limit position.

[Clause 9] The mixer faucet according to any one of clauses 1 to 8, wherein
the upper case includes an over-tilting prevention abutting surface that abuts on the tilting lever when the lever tilting position is situated at a limit position.

[Clause 10] The mixer faucet according to any one of clauses 1 to 9, wherein
the faucet main body includes a valve fixing member that holds the valve assembly down from above using an axial force of a screw connection,
the valve assembly further includes a ratchet plate that abuts on the valve fixing member and prevents the valve fixing member from rotating in a direction in which the screw connection is loosened, and
the click rotary member includes a ratchet retaining portion that is located on an upper side of the ratchet plate regardless of the left-right lever position.

[Clause 11] A mixer faucet including:
a faucet main body;
a lever handle that is configured to turn forward and rearward and also turn leftward and rightward; and
a valve assembly that is housed inside the faucet main body, wherein
the valve assembly includes:
a fixed valve body that has a hot water supply hole, a cold water supply hole, and a drain hole;
a movable valve body that has a flow path forming recess and that is configured to move on the fixed valve body;
a tilting lever that is configured to: move in conjunction with a movement of the lever handle, turn forward and rearward to change a lever tilting position, and turn leftward and rightward to change a left-right lever position;
a lower case that is disposed on a lower side of the fixed valve body and has a hot water inlet hole, a cold water inlet hole, and a discharge hole;
an upper case that is fixed to the lower case, the upper case and the lower case constituting an outer surface of the valve assembly;
a lower sealing member that seals a gap between the lower case and the faucet main body; and
an inner sealing member that is disposed between the fixed valve body and the lower case, and that seals a gap between the hot water supply hole and the hot water inlet hole, a gap between the cold water supply hole and the cold water inlet hole, and a gap between the drain hole and the discharge hole, wherein
the tilting lever includes an exposed lever portion that is exposed to an outside and upper side of the valve assembly, and
the exposed lever portion includes a through hole that has an empty inside and contains nothing therein.

In the present disclosure, inventions other than those included in claims (including independent claims) are also described. The forms, members, configurations, and combinations thereof described in the claims and the embodiments of the present disclosure should be recognized as inventions based on the functions and effects of each of them.

The forms, members, configurations, and the like shown in the above-described embodiments are each independently applicable to all inventions described in the present disclosure, including those set forth in the claims of the present disclosure, even if not every form, member, or configuration described in the embodiments is used.

LIST OF REFERENCE CHARACTERS

10 Mixer faucet
14 Lever handle
16 Discharge portion
18 Hot water inlet pipe
20 Cold water inlet pipe
22 Discharge pipe
38 Valve assembly
40 Upper sealing member
42 Upper case
42a Over-tilting prevention abutting surface
44 Rotatable body
46 Tilting lever
46a Lever shaft
46b Lever cap
48 Lever sealing member
53 Fixing screw
56 Click rotary member
58 Ratchet plate
60 Movable valve body
62 Fixed valve body
64 Inner sealing member
66 Lower sealing member
68 Lower case
120 Smaller-diameter cylindrical portion of the upper case
122 Larger-diameter cylindrical portion of the upper case
144 Cover portion of the lever cap
150 Flange portion of the lever cap
154 Protruded extension portion of the lever cap
162 Base portion of the click rotary member
164 Cylinder forming portion of the click rotary member
168 Downward extension portion
170 First click engaging portion
180 First lever abutting surface
182 Upwardly projected curved surface
184 Second lever abutting surface
190 Metal member of the click rotary member
192 Resin member of the click rotary member
200 Second click engaging portion
212 Exposed lever portion
214 First abutment portion 216 Second abutment portion
220 Click retention portion
222 Over-tilting prevention portion
226 Ratchet retaining portion
S1 Valve-bodies surrounding space
PL1 First sliding surface
PL2 Second sliding surface
PL3 Sliding interface

The invention claimed is:

1. A mixer faucet comprising:
a faucet main body;
a lever handle that is configured to turn forward and rearward and also turn leftward and rightward; and
a valve assembly that is housed inside the faucet main body, the valve assembly including:
 a fixed valve body that has a hot water supply hole, a cold water supply hole, and a drain hole;
 a movable valve body that has a flow path forming recess and that is configured to move on the fixed valve body;
 a tilting lever that is configured to: move in conjunction with a movement of the lever handle, turn forward and rearward to change a lever tilting position, and turn leftward and rightward to change a left-right lever position;
 a lower case that is disposed on a lower side of the fixed valve body and has a hot water inlet hole, a cold water inlet hole, and a discharge hole;
 an upper case that is fixed to the lower case, the upper case and the lower case constituting an outer surface of the valve assembly;
 a lower sealing member that seals a gap between the lower case and the faucet main body;
 an inner sealing member that is disposed between the fixed valve body and the lower case, and that seals a gap between the hot water supply hole and the hot water inlet hole, a gap between the cold water supply hole and the cold water inlet hole, and a gap between the drain hole and the discharge hole; and
 a click rotary member that is exposed to an outside of the valve assembly and is configured to be rotated leftward and rightward by a rotation force applied from the tilting lever, wherein
the click rotary member includes a first click engaging portion,
the upper case includes a second click engaging portion,
an engagement between the first click engaging portion and the second click engaging portion generates a left-right click, and
the left-right click is a sound or a feeling transmitted to a user's hand, and is generated at one or more predetermined left-right lever positions when the lever handle is turned leftward and rightward and the first click engaging portion rotates past the second click engaging portion.

2. The mixer faucet according to claim 1, wherein
the mixer faucet further includes:
 an upper sealing member that seals a gap between the upper case and the faucet main body; and
 a lever sealing member that seals a gap between the upper case and a lever interlocking portion that moves in conjunction with a movement of the tilting lever.

3. The mixer faucet according to claim 2, wherein
the tilting lever includes a spherical body, and
the lever sealing member seals a gap between the upper case and the spherical body.

4. The mixer faucet according to claim 1, wherein
the tilting lever includes a lever shaft and a lever cap that is attached to the lever shaft.

5. The mixer faucet according to claim 1, wherein
the tilting lever includes:
 a first abutment portion that transmits the rotation force to the click rotary member; and
 a second abutment portion that is located at a position different from the first abutment portion and also transmits the rotation force to the click rotary member.

6. The mixer faucet according to claim 5, wherein
the tilting lever includes a lever shaft and a lever cap that is attached to the lever shaft, and
the lever cap includes the first abutment portion and the second abutment portion.

7. The mixer faucet according to claim 1, wherein
the tilting lever includes a click retention portion that is located on an upper side of the click rotary member regardless of the lever tilting position.

8. The mixer faucet according to claim 1, wherein
the tilting lever includes an over-tilting prevention portion that abuts on the upper case when the lever tilting position is situated at a limit position.

9. The mixer faucet according to claim 1, wherein
the upper case includes an over-tilting prevention abutting surface that abuts on the tilting lever when the lever tilting position is situated at a limit position.

10. The mixer faucet according to claim 9, wherein
the tilting lever includes a lever shaft and a lever cap that is attached to the lever shaft, and
the lever cap includes the over-tilting prevention portion.

11. The mixer faucet according to claim 1, wherein
the faucet main body includes a valve fixing member that holds the valve assembly down from above using an axial force of a screw connection,
the valve assembly further includes a ratchet plate that abuts on the valve fixing member and prevents the valve fixing member from rotating in a direction in which the screw connection is loosened, and
the click rotary member includes a ratchet retaining portion that is located on an upper side of the ratchet plate regardless of the left-right lever position.

12. The mixer faucet according to claim 1, wherein
the tilting lever includes an exposed lever portion that is exposed to an outside and upper side of the valve assembly, and
the exposed lever portion includes a through hole that has an empty inside and contains nothing therein.

13. The mixer faucet according to claim 1, wherein
the tilting lever directly abuts on the click rotary member, thereby allowing the tilting lever to apply the rotation force to the click rotary member.

14. The mixer faucet according to claim 1, wherein
the valve assembly further includes a rotatable body that supports the movable valve body while allowing the movable valve body to slide on the rotatable body, and that is rotated together with the movable valve body by leftward and rightward turning of the tilting lever.

15. The mixer faucet according to claim 14, wherein
the rotatable body is not exposed to the outside of the valve assembly.

16. The mixer faucet according to claim 15, wherein
the tilting lever includes a spherical body, and
the rotatable body includes a spherical body support portion that supports the spherical body.

17. A mixer faucet comprising:
a faucet main body;
a lever handle that is configured to turn forward and rearward and also turn leftward and rightward; and
a valve assembly that is housed inside the faucet main body, the valve assembly including:
  a fixed valve body that has a hot water supply hole, a cold water supply hole, and a drain hole;
  a movable valve body that has a flow path forming recess and that is configured to move on the fixed valve body;
  a tilting lever that is configured to: move in conjunction with a movement of the lever handle, turn forward and rearward to change a lever tilting position, and turn leftward and rightward to change a left-right lever position;
  a lower case that is disposed on a lower side of the fixed valve body and has a hot water inlet hole, a cold water inlet hole, and a discharge hole;
  an upper case that is fixed to the lower case, the upper case and the lower case constituting an outer surface of the valve assembly;
  a lower sealing member that seals a gap between the lower case and the faucet main body;
  an inner sealing member that is disposed between the fixed valve body and the lower case, and that seals a gap between the hot water supply hole and the hot water inlet hole, a gap between the cold water supply hole and the cold water inlet hole, and a gap between the drain hole and the discharge hole; and
  a click rotary member that is exposed to an outside of the valve assembly and is configured to be rotated leftward and rightward by a rotation force applied from the tilting lever, wherein
the click rotary member includes a first click engaging portion,
the upper case includes a second click engaging portion,
an engagement between the first click engaging portion and the second click engaging portion generates a left-right click,
the tilting lever includes a lever shaft and a lever cap that is attached to the lever shaft,
the mixer faucet further includes a fixing screw that fixes the lever handle to the tilting lever,
the lever cap includes a cover portion that covers the lever shaft, and
the fixing screw presses the lever shaft with the cover portion interposed between the fixing screw and the lever shaft.

18. A mixer faucet comprising:
a faucet main body;
a lever handle that is configured to turn forward and rearward and also turn leftward and rightward; and
a valve assembly that is housed inside the faucet main body, the valve assembly including:
  a fixed valve body that has a hot water supply hole, a cold water supply hole, and a drain hole;
  a movable valve body that has a flow path forming recess and that is configured to move on the fixed valve body;
  a tilting lever that is configured to: move in conjunction with a movement of the lever handle, turn forward and rearward to change a lever tilting position, and turn leftward and rightward to change a left-right lever position;
  a lower case that is disposed on a lower side of the fixed valve body and has a hot water inlet hole, a cold water inlet hole, and a discharge hole;
  an upper case that is fixed to the lower case, the upper case and the lower case constituting an outer surface of the valve assembly;
  a lower sealing member that seals a gap between the lower case and the faucet main body;
  an inner sealing member that is disposed between the fixed valve body and the lower case, and that seals a gap between the hot water supply hole and the hot water inlet hole, a gap between the cold water supply hole and the cold water inlet hole, and a gap between the drain hole and the discharge hole; and
  a click rotary member that is exposed to an outside of the valve assembly and is configured to be rotated leftward and rightward by a rotation force applied from the tilting lever, wherein
the click rotary member includes a first click engaging portion,
the upper case includes a second click engaging portion,
an engagement between the first click engaging portion and the second click engaging portion generates a left-right click, and
the click rotary member is placed on and covers a cylindrical portion that constitutes an upper portion of the upper case without being fixed thereto.

19. The mixer faucet according to claim 18, wherein
the tilting lever includes a click retention portion that is located on an upper side of the click rotary member regardless of the lever tilting position.

20. The mixer faucet according to claim 19, wherein
the tilting lever includes a lever shaft and a lever cap that is attached to the lever shaft, and
the lever cap includes the click retention portion.

* * * * *